(12) United States Patent
Shigei

(10) Patent No.: US 9,912,587 B2
(45) Date of Patent: Mar. 6, 2018

(54) COMMUNICATION APPARATUS, COMMUNICATION METHOD, AND COMMUNICATION SYSTEM

(75) Inventor: Hiroyuki Shigei, Tokyo (JP)

(73) Assignee: SONY CORPORATION, Tokyo (JP)

( * ) Notice: Subject to any disclaimer, the term of this patent is extended or adjusted under 35 U.S.C. 154(b) by 710 days.

(21) Appl. No.: 14/233,487

(22) PCT Filed: Jul. 11, 2012

(86) PCT No.: PCT/JP2012/067655
§ 371 (c)(1),
(2), (4) Date: Jan. 17, 2014

(87) PCT Pub. No.: WO2013/015114
PCT Pub. Date: Jan. 31, 2013

(65) Prior Publication Data
US 2014/0126415 A1    May 8, 2014

(30) Foreign Application Priority Data

Jul. 25, 2011    (JP) .................................. 2011-161646

(51) Int. Cl.
| | | |
|---|---|---|
| H04L 12/58 | (2006.01) | |
| H04L 12/721 | (2013.01) | |
| H04L 12/729 | (2013.01) | |
| H04L 12/707 | (2013.01) | |

(52) U.S. Cl.
CPC ............ *H04L 45/70* (2013.01); *H04L 45/125* (2013.01); *H04L 45/22* (2013.01); *H04L 45/24* (2013.01)

(58) Field of Classification Search
CPC ....... H04L 45/125; H04L 45/22; H04L 45/24; H04L 45/70
See application file for complete search history.

(56) References Cited

U.S. PATENT DOCUMENTS

| | | | |
|---|---|---|---|
| 7,725,096 B2 | 5/2010 | Riveiro et al. | |
| 7,768,926 B2* | 8/2010 | Bellur | H04L 43/0882 370/238 |
| 7,808,985 B2 | 10/2010 | Romero et al. | |

(Continued)

FOREIGN PATENT DOCUMENTS

| | | |
|---|---|---|
| JP | 2002-271325 A | 9/2002 |
| JP | 2006-025274 A | 1/2006 |

(Continued)

*Primary Examiner* — Charles C Jiang
*Assistant Examiner* — Ryan Kavleski
(74) *Attorney, Agent, or Firm* — Chip Law Group

(57) ABSTRACT

Communication is performed by selecting any one of or two or more paths from among multiple paths existing between a communication apparatus and the other party in communication. In addition to measuring an effective rate itself, the effective rate is estimated from a combination of Phy rate, received power, Phy rate, and statistics information. Then, on the basis of information about the effective rate of each path, a path used for data transmission is selected according to a single selection method for selecting a single path or a multi-selection method for selecting multiple paths at a time. The single selection method can be classified into a method for each session or a physically exclusive method. The multi-selection method includes weighting method and redundancy degree attaching method.

24 Claims, 21 Drawing Sheets

(56) References Cited

U.S. PATENT DOCUMENTS

| | | | |
|---|---|---|---|
| 7,877,078 B2 | 1/2011 | Riveiro et al. | |
| 7,899,436 B2 | 3/2011 | Riveiro et al. | |
| 7,970,374 B2 | 6/2011 | Riveiro et al. | |
| 8,098,648 B2 | 1/2012 | Nakata et al. | |
| 8,204,472 B2 | 6/2012 | Riveiro et al. | |
| 8,213,895 B2 | 7/2012 | Hurwitz et al. | |
| 8,263,937 B2 | 9/2012 | Itsuji | |
| 8,406,239 B2 | 3/2013 | Hurwitz et al. | |
| 8,538,369 B2 | 9/2013 | Riveiro et al. | |
| 8,571,046 B2 | 10/2013 | Romero et al. | |
| 2002/0085495 A1* | 7/2002 | Jeffries | H04L 45/12 370/235 |
| 2002/0129147 A1 | 9/2002 | Ogasawara | |
| 2004/0156367 A1* | 8/2004 | Albuquerque | H04L 12/5693 370/395.4 |
| 2005/0005038 A1* | 1/2005 | Ayukawa | G06F 3/0601 710/38 |
| 2006/0034233 A1* | 2/2006 | Strutt | H04L 45/123 370/338 |
| 2006/0224813 A1* | 10/2006 | Rooholamini | H04L 12/5695 710/316 |
| 2007/0076666 A1 | 4/2007 | Riveiro et al. | |
| 2007/0165526 A1* | 7/2007 | Lee | H04L 1/0016 370/230 |
| 2008/0108352 A1* | 5/2008 | Montemurro | H04L 43/0847 455/437 |
| 2008/0159358 A1 | 7/2008 | Ruiz et al. | |
| 2009/0245248 A1* | 10/2009 | Arberg | H04L 12/185 370/390 |
| 2010/0246480 A1* | 9/2010 | Aggarwal | H04L 45/123 370/328 |
| 2011/0205918 A1 | 8/2011 | Hurwitz | |
| 2012/0014459 A1 | 1/2012 | Riveiro et al. | |
| 2012/0057489 A1* | 3/2012 | Shiotsuki | H04W 40/12 370/252 |
| 2012/0243621 A1 | 9/2012 | Hurwitz et al. | |
| 2012/0263066 A1 | 10/2012 | Hurwitz et al. | |
| 2013/0177025 A1 | 7/2013 | Hurwitz et al. | |
| 2013/0259096 A1 | 10/2013 | Romero et al. | |

FOREIGN PATENT DOCUMENTS

| | | |
|---|---|---|
| JP | 2008-042314 A | 2/2008 |
| JP | 2010-528513 A | 8/2010 |
| JP | 2010-278845 A | 12/2010 |
| JP | 5-284184 B2 | 9/2013 |
| WO | 2005-067227 A1 | 7/2005 |

* cited by examiner

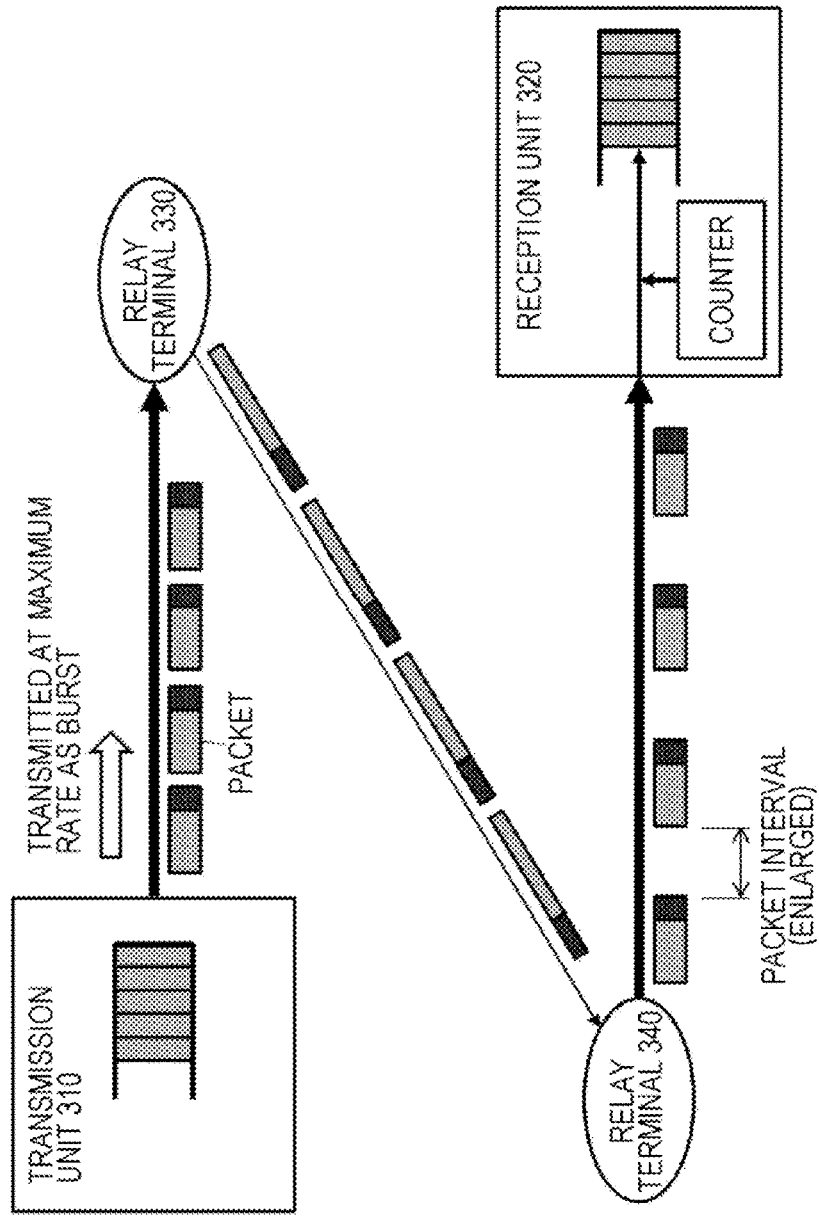

| Phy LAYER RATE | IP LAYER MAXIMUM EFFECTIVE RATE (MTU1514 BYTES) |
|---|---|
| 10Mbps (10Base-T) | 9.75Mbps |
| 100Mbps (100Base-TX) | 97.5Mbps |
| 1Gbps (1000Base-T) | 975Mbps |

COMMUNICATION APPARATUS, COMMUNICATION METHOD, AND COMMUNICATION SYSTEM

CROSS-REFERENCE TO RELATED APPLICATION

The present application is a national phase entry under 35 U.S.C. § 371 of International Application No. PCT/JP2012/067655 filed Jul. 11, 2012, published on Jan. 31, 2013 as WO 2013/015114 A1, which claims priority from Japanese Patent Application No. JP 2011-161646 filed in the Japanese Patent Office on Jul. 25, 2011.

TECHNICAL FIELD

A technique disclosed in the present specification relates to a communication apparatus, a communication method, and a communication system for communication with a party with which a plurality of paths exist, and more particularly, relates to a communication apparatus, a communication method, and a communication system for communicating upon selecting any one of or two or more paths from among a plurality of paths that exist between the communication apparatus and a communication party.

BACKGROUND ART

In the past, most of IP (Internet Protocol) communications inside of a home use IEEE802.3, which is a standard specification of Ethernet (registered trademark). Recently, transmission paths of various media are used, such as wireless LAN (Local Area Network) such as IEEE802.11, PLC (Power Line Communication) using power line as a conveying path, and MoCA (Multimedia over Coax Alliance) performing high speed data communication using a coaxial cable. Among IEEE802.11 system, not only ordinary infrastructure connection but techniques providing multiple paths such as WiFi-Direct, TDLS (Tunneled Direct Link Setup) are begun to be used. In the TDLS, when data are transmitted directly between terminal stations without relying on an access point, the TDLS defines connection processing performed using data/packets between the terminal stations.

Under such environment where multiple paths are provided, it may be possible to use multiple paths between terminals which are desired to communication with each other. However, it is necessary for a user to be aware of making selection as to which of these paths is to be used, but the user cannot easily find out which path is the optimum path.

For example, a network interface device configured to determine a medium through which a communication signal is transmitted on the basis of Quality of Service (QoS) measurement criteria associated with the media has been suggested (for example, see Patent Document 1). This network interface device carries out at least two of the communication techniques including a power line technique, a telephone line technique, and a coaxial cable technique, and can communicate with another device connected to a network by means of the same communication technique.

On the other hand, communication methods such as IEEE802.11 and PLC have less effective band width and are easily affected by external elements, as compared to IEEE802.3. For this reason, in some cases, it may be impossible to ensure sufficient band width when only a single path of IEEE802.11 or PLC is used. In the communication path of IEEE802.11 or PLC, the effective rate changes same, and the optimum path changes at all times, but it is impossible to select the optimum path at all times.

CITATION LIST

Patent Document

Patent Document 1: JP 2010-528513 W

SUMMARY OF THE INVENTION

Problems to be Solved by the Invention

An object of a technique disclosed in this specification is to provide a communication apparatus, a communication method, and a communication system which are superior and can communicate in a preferable manner upon selecting one of or two or more paths from among multiple paths that exist between the communication apparatus and the other party in communication.

Another object of a technique disclosed in this specification is a communication apparatus, a communication method, and a communication system which are superior and can communicate in a preferable manner by using, at a time, multiple paths that exist between the communication apparatus and the other party in communication.

Solutions to Problems

This application is made in view of the above problems, the technique according to claim 1 is a communication apparatus including:

an information collection unit configured to collect information about each of a plurality of paths existing between the communication apparatus and the other party in communication;

a path selection unit configured to select a single path or two or more paths from among the plurality of paths, on the basis of the information collected by the information collection unit; and a data transmission unit configured to transmit data upon distributing packets to the path selected by the path selection unit.

According to the technique described in claim 2 of this application, the information collection unit of the communication apparatus according to claim 1 is configured to measure an effective rate of each path on the basis of an arrival interval of packets at the other party in communication when packets having a length of predetermined bytes is transmitted to the path as a burst.

According to the technique described in claim 3 of this application, the information collection unit of the communication apparatus according to claim 1 is configured to include a maximum effective rate table describing correspondence relationship of a physical layer rate and a maximum effective rate of each path, and obtain a maximum effective rate corresponding to a physical layer rate determined by the data transmission unit in each path from the maximum effective rate table.

According to the technique described in claim 4 of this application, the information collection unit of the communication apparatus according to claim 3 is configured to dynamically find the maximum effective rate by obtaining a physical layer rate with a regular interval of time for a path of which physical layer rate dynamically changes.

According to the technique described in claim 5 of this application, the information collection unit of the communication apparatus according to claim 3 is configured to look up the physical layer rate determined by the data transmission unit in the maximum effective rate table in a path connected to the other party in communication via a same access point, thereby obtaining a first maximum effective rate of a first half of the path from the communication apparatus to the access point, and receive a signal from the access point to the other party in communication, look up the physical rate determined based on the reception signal in the maximum effective rate table, obtain the second maximum effective rate of a latter half of the path from the access point to the other party in communication, and on the basis of the first and the second maximum effective rates, estimate the maximum effective rate via the access point to the other party in communication.

According to the technique described in claim 6 of this application, the information collection unit of the communication apparatus according to claim 3 is configured to look up the physical layer rate determined by the data transmission unit in the maximum effective rate table in a path connected to the other party in communication via a same access point, thereby obtaining a first maximum effective rate of a first half of the path from the communication apparatus to the access point, and receive information about the physical rate of a signal from the access point to the other party in communication from the other party in communication, look it up in the maximum effective rate table to obtain the second maximum effective rate of a latter half of the path from the access point to the other party in communication, and on the basis of the first and the second maximum effective rates, estimate the maximum effective rate via the access point to the other party in communication.

According to the technique described in claim 7 of this application, the information collection unit of the communication apparatus according to claim 5 is configured such that, when a path from the communication apparatus to the access point and a path from the access point to the other party in communication belong to the same frequency, the information collection unit estimates the maximum effective rate to the other party in communication via the access point on the basis of an average value of the first maximum effective rate and the second maximum effective rate, and when the path from the communication apparatus to the access point and the path from the access point to the other party in communication belong to different frequencies, the information collection unit estimates the maximum effective rate via the access point to the other party in communication on the basis of the first maximum effective rate or the second maximum effective rate whichever is smaller.

According to the technique described in claim 8 of this application, the information collection unit of the communication apparatus according to claim 1 is configured to include a maximum effective rate table describing correspondence relationship of a received power level and a maximum effective rate of a path connected using wireless technique, and estimate the maximum effective rate of the path by looking up, in the maximum effective rate table, a received power level measured in a path directly connected to the other party in communication using the wireless technique.

According to the technique described in claim 9 of this application, the information collection unit of the communication apparatus according to claim 8 is configured to include a plurality of maximum effective rate tables according to a transmission parameter including at least one of supported maximum stream number, whether aggregation is effective or not, aggregation maximum size, MTU length, protocol, and used frequency, and obtain a transmission parameter of a path directly connected to the other party in communication using the wireless technique, and estimate the maximum effective rate of the path by looking it up the corresponding maximum effective rate table.

According to the technique described in claim 10 of this application, the information collection unit of the communication apparatus according to claim 3 is configured to obtain the estimation value of the maximum effective rate of a path using a wireless technique, on the basis of statistics information about the path using the wireless technique, and a maximum effective rate obtained by looking up, in the maximum effective rate table, the physical layer rate of the path using the wireless technique.

According to the technique described in claim 11 of this application, the information collection unit of the communication apparatus according to claim 10 is configured to obtain a normal transmission rate of a packet transmitted with the physical layer rate to a path using the wireless technique in a predetermined period in the past, as the statistics information about the path using the wireless technique, and multiply the maximum effective rate obtained by looking up the maximum effective rate table by the normal transmission rate, and obtain the estimation value of the maximum effective rate of the path using the wireless technique.

According to the technique described in claim 12 of this application, the path selection unit of the communication apparatus according to claim 2 is configured such that, when a single path is selected for each session, the path selection unit obtains an estimation value of a remaining rate of each path on the basis of a measurement value of an effective rate of each path, and selects a path of which remaining rate estimation value is the maximum.

According to the technique described in claim 13 of this application, the path selection unit of the communication apparatus according to claim 3 is configured such that, when a single path is selected for each session, the path selection unit calculates a summation of predicted effective rates of sessions that are already transmitted in paths, and obtains an estimation value of a remaining rate for each path by subtracting the predicted effective rate summation value from the estimation value of the maximum effective rate of each path by the information collection unit, and selects a path of which remaining rate estimation value is the maximum.

According to the technique described in claim 14 of this application, the path selection unit of the communication apparatus according to claim 12 is configured to give an order of priority to the paths on the basis of transmission stability, and select a path of which order of priority is the highest from among paths of which remaining effective rates are higher than the effective rate required to transmit the session.

According to the technique described in claim 15 of this application, the path selection unit of the communication apparatus according to claim 1 is configured such that, when a single path is selected for each logical circuit, the path selection unit obtains an estimation value of a remaining rate of each path, and selects a path of which remaining rate estimation value is the maximum.

According to the technique described in claim 16 of this application, the path selection unit of the communication apparatus according to claim 1 is configured such that, when a single path is selected for each logical circuit, the path selection unit obtains an estimation value of a remaining rate of each path, and selects a path of which order of priority is the highest from among paths of which remaining effective rates are higher than the effective rate required to transmit the session.

According to the technique described in claim 17 of this application, the path selection unit of the communication apparatus according to claim 1 is configured to select a path so that load is distributed in accordance with capacity of each path.

According to the technique described in claim 18 of this application, the path selection unit of the communication apparatus according to claim 17 is configured to define a credit representing a load of each path, select a path of which credit is the lowest, define a weight of each path from a remaining rate estimation value of each path on the basis of the information obtained by the information collection unit, and update the credit of the path by adding a value obtained by multiplying a size of a packet transmitted to the selected path by a weight of the path.

According to the technique described in claim 19 of this application, the path selection unit of the communication apparatus according to claim 1 is configured to select two or more paths from among the plurality of paths, and the data transmission unit is configured to transmit the same packet to the two or more paths selected by the path selection unit.

According to the technique described in claim 20 of this application, the data transmission unit of the communication apparatus according to claim 19 is configured to transmit all the packets to all the paths selected by the path selection unit.

According to the technique described in claim 21 of this application, the data transmission unit of the communication apparatus according to claim 19 is configured to adopt, as representing paths, some of the two or more paths selected by the path selection unit, transmit a packet to all the representing paths, and transmit a copy of the packet to the remaining paths as much as possible.

According to the technique described in claim 22 of this application, the data transmission unit of the communication apparatus according to claim 19 is configured to determine a copy number for each packet, and select paths as many as the copy number from among the two or more paths selected by the path selection unit, and transmit packets thereto.

The technique according to claim 23 of this application is a communication method including:

an information collection step for collecting information about each of a plurality of paths existing between the communication apparatus and the other party in communication;

a path selection step for selecting a single path or two or more paths from among the plurality of paths, on the basis of the information collected by the information collection unit; and a data transmission step for transmitting data upon distributing packets to the path selected by the path selection unit.

The technique according to claim 24 of this application is a communication system, where a plurality of paths exist between a transmission communication apparatus and a reception communication apparatus, wherein the transmission communication apparatus selects a single path or two or more paths from among the plurality of paths, on the basis of the information collected from each of the plurality of paths, and transmits data upon distributing packets to the path selected.

However, the "system" referred to herein means an object obtained by logically aggregating multiple apparatuses (or function modules for achieving particular functions), and is not limited as to whether each apparatus or a function module is provided in a single housing or not.

Effects of the Invention

According to a technique disclosed in this specification, a communication apparatus, a communication method, and a communication system can be provided, which are superior and can communicate in a preferable manner upon selecting one of or two or more paths from among multiple paths that exist between the communication apparatus and the other party in communication.

According to a technique disclosed in this specification, a communication apparatus, a communication method, and a communication system can be provided, which are superior and can communicate in a preferable manner by using, at a time, multiple paths that exist between the communication apparatus and the other party in communication.

Other objects, features, and advantages of the technique disclosed in this specification will become apparent from detailed description based on attached drawings and embodiments explained below.

BRIEF DESCRIPTION OF DRAWINGS

FIG. 3A is a figure for explaining a measurement method of the maximum effective rate.

MODE FOR CARRYING OUT THE INVENTION

An embodiment of a technique disclosed in this specification will be explained in detail with reference to drawings.

The technique disclosed in this specification can be applied to the following networks (mainly for L2 to L4 layers).

(1) IP Communication Path

The technique disclosed in this specification can also be applied to similar connectionless packet communication.

(2) Home Network

The technique disclosed in this specification can also be applied to medium-sized networks such as a carrier network and an enterprise LAN.

The technique disclosed in this specification can be applied to the following circuits (Phy layers).

Figure 1:
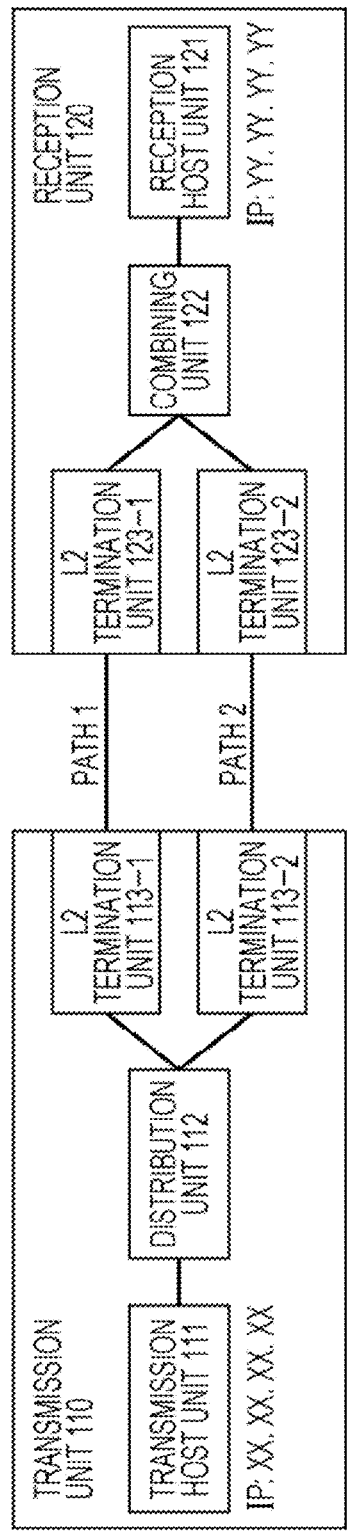
FIG. 1 is a figure illustrating an example of network topology to which a technique disclosed in this specification can be applied.

(1) IEEE802.3
(2) IEEE802.11
(3) PLC
(4) coaxial lines such as MoCA
(5) communication system combined with other signals such as HDMI, DiiVA
(6) communication system within carriers such as ATM, SONET, SDH
(7) wireless access network system such as W-CDMA, CDMA2000, WiMAX, LTE
(8) access network system such as ADSL, FTTH
(9) all circuit systems transmitting packets FIG. 1 illustrates an example of network topology to which a technique disclosed in this specification can be applied. In the example in the figure, a transmission unit 110 and a reception unit 120 are directly connected by way of multiple paths (path 1 and path 2).

The transmission unit 110 includes a transmission host unit 111 having an IP address XX.XX.XX.XX assigned thereto, a distribution unit 112 for distributing transmission data given by the transmission host unit 111 to the paths, and L2 termination units 113-1, 113-2 provided for the paths. The L2 termination units 113-1, 113-2 are provided for each L2 technique used by the transmission unit 110.

On the other hand, the reception unit 120 includes a reception host unit 121 having an IP address YY.YY.YY assigned thereto, L2 termination units 123-1, 123-2 for the paths, and a combining unit 122 for combining data received by the L2 termination units 123-1, 123-2 and giving the combined data to the reception host unit 121. The L2 termination units 123-1, 123-2 are provided for each L2 technique used by the reception unit 120.

In the figure the paths 1, 2 are considered to be logically different paths. However, the path 1 and the path 2 may be physically separated or may not be physically separated. In some cases, the paths 1, 2 may be physically bridged by several devices.

In the example of configuration as illustrated in FIG. 1, the technique disclosed in this specification explained later may be applied to both of the transmission unit 110 and the reception unit 120.

Figure 2:
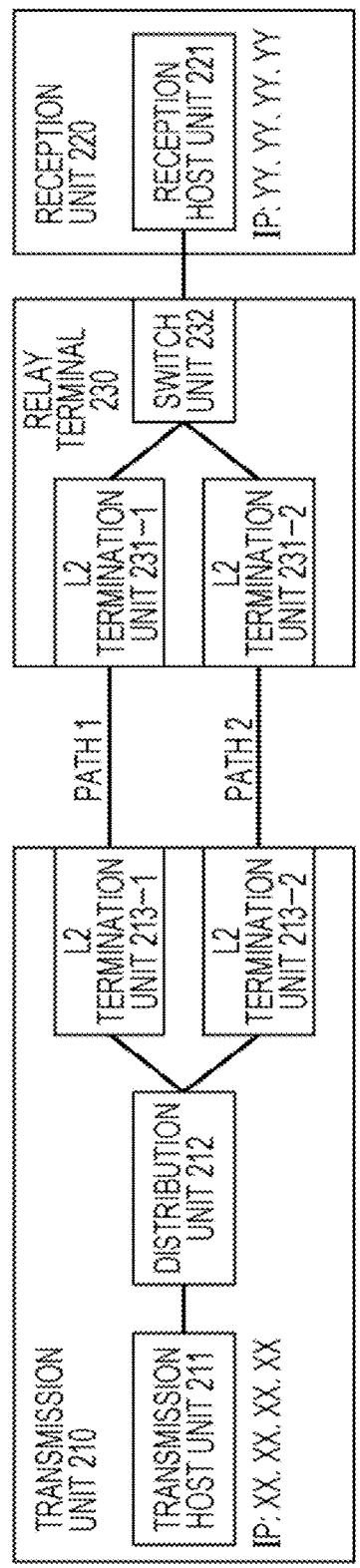
FIG. 2 is a figure illustrating another example of network topology to which a technique disclosed in this specification can be applied.

FIG. 2 illustrates another example of network topology to which a technique disclosed in this specification can be applied. In the example in the figure, a transmission unit 210 and a reception unit 220 are connected via a relay terminal 230.

The transmission unit 210 includes a transmission host unit 211 having an IP address XX.XX.XX.XX assigned thereto, a distribution unit 212 for distributing transmission data given by the transmission host unit 211 to the paths, and L2 termination units 213-1, 213-2 provided for the paths. The L2 termination units 213-1, 213-2 are provided for each L2 technique used by the transmission unit 210.

The relay terminal 230 includes L2 termination units 231-1, 231-2 for the paths, and a switch unit (SW) 232 for switching the relay destination of the data received by the L2 termination units 231-1, 231-2. The L2 termination units 231-1, 231-2 are provided for each L2 technique with which the relay terminal 230 performs relaying.

The reception unit 220 includes a reception host unit 221 having an IP address YY.YY.YY assigned thereto.

The example of configuration of as illustrated in FIG. 2 indicates that multiple paths between the transmission unit 210 and the reception unit 220 are physically reduced to one path by the relay terminal 230 interposed therebetween. In this case, the technique disclosed in this specification can be applied to only the transmission unit 210.

This specification discloses path selection method, i.e., a technique related to communication method for communicating upon selecting one or two or more paths from among multiple paths existing between the transmission unit and the reception unit.

In this case, the path selection roughly includes a path selection method for each session and a path selection method between sessions.

The former, i.e., the path selection method for each session, includes a case where multiple paths are used at a time for the same session and a case where any one of multiple paths is selected and used for the same session.

When multiple paths are used at a time for the same session, there are two cases: a case where all the available paths are used, and a case where several paths are selected and used at a time from among all the available paths.

The latter, i.e., the path selection method between sessions, includes a case where the same path is used for all the sessions, and a case where the optimum path is used for each session.

The "session" as referred to in this specification means communication having the following unique combinations.

(1) Destination address (DA) and source address (SA) of MAC layer (2) Combination of DA and SA, and, the type of protocol of MAC layer (3) Combination of DA and SA of IP layer (4) Combination of destination port (DP) and source port (SP) of TCP layer and DA and SA of IP layer (5) Combination of DP and SP of UDP layer and DA and SA of IP layer The path selection is roughly divided into two steps, which include information about the effective rate of each path is first collected, and then, the path is selected on the basis of the obtained information.

The former, i.e., the method of collecting information about the effective rate, is considered to include not only measuring the effective rate itself, but also a method of estimating the effective rate from Phy (physical layer) rate, a method of estimating the effective rate from the received power, and a method of estimating the effective rate from a combination of Phy rate and statistics information.

The path selection method for selecting the path on the basis of information obtained by using these methods is roughly classified into a single selection method of selecting a single path and a multi-selection method of selecting multiple paths at a time. The single selection method can be further classified into an exclusive method for each session and a physically exclusive method. Any of the exclusive methods includes best effort method and QoS (Quality of Service) method. On the other hand, the multi-selection method includes weighting method and redundancy degree attaching method.

In the explanation below, information collection methods for path selection and path selection methods will be explained in detail.

A. Information Collection Method for Path Selection

A-1. Measurement Method of Effective Rate In this case, a method for measuring the effective rate of a path between the transmission unit and the reception unit will be explained.

First, a control session is established in a path between the transmission unit and the reception unit, of which effective rate is to be measured. When there is a path in which a control session cannot be established, the fact itself that the session cannot be established is the information about the effective rate.

In this case, the reception unit is provided with such mechanism that a processing circuit of MAC layer or Phy layer includes a counter that increases by itself with a regular interval of time in order to measure a reception time, and the counter value at a point in time when a packet is received is saved for each packet, and the reception time is saved by hardware.

Then, the transmission unit transmits m successive packets having a length of n bytes. During transmission, the transmission is performed at the maximum rate with respect to the circuit rate of L2 circuit connected to the transmission unit. The transmission time of the packets transmitted under such condition is such that time Tt[1] when the first packet is transmitted is adopted as reference, which means that Tt[1] is 0, and the transmission times of the second and subsequent packets are Tt[2], Tt[3], . . . , Tt[m].

On the other hand, the reception unit measures arrival intervals of m successive packets having a length of n bytes transmitted from the transmission unit. More specifically, the arrival times of the m packets are such that time Tr[1] when the first packet arrives is adopted as a reference, i.e., Tr[1] is 0, and the arrival times of the second and subsequent packets are Tr[2], Tr[3], . . . , Tr[m]. The reception unit calculates the average effective rate [Mbps] of the circuit between the transmission unit and the reception unit according to the following the following expression (1).

[Math 1]

$$\text{average effective rate} = 8 \times n/m \times (Tr[m]-Tr[1]) \text{ [Mbps]} \quad (1)$$

Then, the reception unit transmits the average effective rate calculated based on the above expression (1) to the transmission unit using the session established for measuring the effective rate.

When an aggregate of packets is used in the circuit between the transmission unit and the reception unit, e.g., A-MPDU (Aggregated Mac Protocol Data Unit) defined in IEEE802.11n, then the number m of transmitted packets having the length of n bytes is a number larger than the maximum number of the aggregate.

In the case of IEEE802.3, the arrival time of a packet at the reception unit makes a time stamp by hardware processing in the MAC layer or Phy layer.

According to the above measurement method, the effective rate can be efficiently measured by transmitting an extremely small number of packets. In addition, it is possible to detect reduction of the effective rate due to collision.

When the transmission unit measures the effective rate for each of the multiple paths between the transmission unit and the reception unit according to the above method, the transmission unit selects a path on the basis of the information.

FIG. 3A illustrates the measurement method of the effective rate. In this case, the transmission unit 310 and the reception unit 320 are connected via several relay terminals 330, 340, and it is considered that there are some portions on the path where the bandwidth is limited. In the figure, the thickness of an arrow represents the bandwidth of the circuit.

A control session is established in the path between the transmission unit 310 and the reception unit 320 of which maximum effective rate is to be measured. Subsequently, the transmission unit 310 transmits m packets having the length of n bytes at the maximum rate as a burst.

At the portion where the bandwidth of the circuit connecting between the relay terminal 330 and the relay terminal 340 is narrow, it takes more time to transmit a packet, which increases the interval of the packets. The once increased packet interval is basically maintained even though the bandwidth of the circuit between the relay terminal 340 and the reception unit 320 increases. In FIG. 3A, the time required for transmission of a packet and the packet interval are represented by lengths.

Figures 3B, 4:
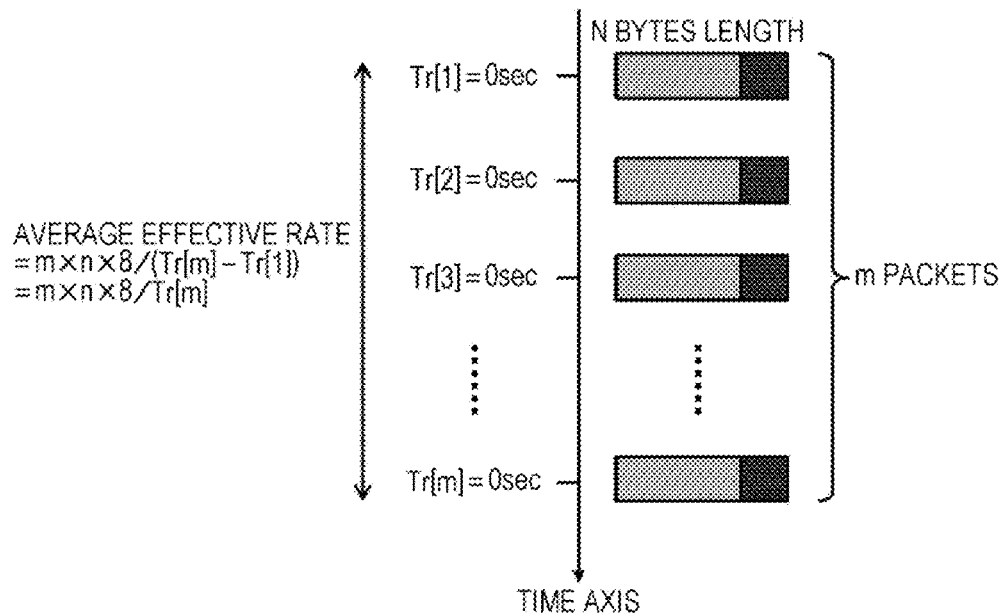
FIG. 3B is a figure for explaining a method for saving arrival times of m packets burst-transmitted and calculating an average effective rate.
FIG. 4 is a figure illustrating an example of configuration of a maximum effective rate table using a theoretical value according to IEEE802.3 technology.

The reception unit 320 obtains and saves the counter value when each of the m burst-transmitted packets as information about the arrival time of each packet. FIG. 3B shows that the arrival times of the m packets are such that time Tr[1] when the first packet arrives is adopted as a reference, i.e., Tr[1] is 0, and the arrival times of the second and subsequent packets are Tr[2], Tr[3], . . . , Tr[m]. Then, the reception unit 320 derives the average effective rate [Mbps] of the circuit between the transmission unit 310 and the reception unit 320 according to the above expression (1).

The transmission unit 310 measures the effective rate for each of the multiple paths between the transmission unit 310 and the reception unit 320 according to the above method, the transmission unit 310 selects a path on the basis of the information.

A-2. Method for Estimating Maximum Effective Rate from Phy Rate (1)

Subsequently, the first method for estimating the maximum effective rate of the path between the transmission unit and the reception unit from Phy rate will be explained. It should be noted that the method explained here can be applied to a case where the transmission unit and the reception unit are directly connected. The following examples will be shown as cases where the transmission unit and the reception unit are directly connected.

(1) A case where, according to IEEE802.11 technology, direct connection is made using Wi-Fi Direct, TDLS, Ad-hoc, or any one of the transmission unit and the reception unit serves as an access point, and direct connection is made therebetween (2) A case where the terminals of both of the transmission unit and the reception unit are connected to the same power line in PLC (3) A case where the terminals of both of the transmission unit and the reception unit are connected to the same topology with coaxial lines (4) The terminals of both of the transmission unit and the reception unit are directly connected without relying on any switch in IEEE802.3 technology In order to achieve this estimation method, the transmission unit includes a maximum effective rate table describing correspondence relationship Phy rate and the maximum effective rate for each L2 technique.

In this case, the maximum effective rate table may use theoretical values. For example, in a case of 100Base-Tx, where the Phy rate is 100 Mbps, and an MTU (Max Transfer Unit), i.e., the maximum packet size that can be handled in IP layer is 1514 bytes, the maximum effective rate in IP layer is as follows: 100 Mbps×(1500/(1514+24))=97.5 Mbps. In IEEE802.11 technology, a theoretical value can also be calculated from an MTU, an aggregate number of packets, and a parameter indicating presence/absence of RTS/CTS which can be obtained by the host. Alternatively, measurement result values at a laboratory may be used as the maximum effective rate table.

Then, the transmission unit looks up the maximum effective rate table from the Phy rate at which the transmission unit transmits a packet, and obtains the maximum effective rate of each path.

When the transmission unit measures the maximum effective rate for each of the multiple paths between the transmission unit and the reception unit according to the above estimation method, the transmission unit selects a path on the basis of the information.

The above estimation method can be used without changing hardware.

The communication path between the transmission unit and the reception unit includes two types: a type in which the Phy rate is determined in the initial negotiation stage, and a type in which the Phy rate is dynamically changed by the link adaptation function according to the communication state during communication. Most of wired paths are the former type. In a wireless path such as wireless LAN, the link adaptation function may be applied, and this is the latter case. In the latter case, the transmission unit obtains the Phy rate with a regular interval of time, and dynamically finds the maximum effective rate.

FIG. 4 illustrates an example of configuration of a maximum effective rate table using a theoretical value according to IEEE802.3 technology. The transmission unit includes a maximum effective rate table describing correspondence relationship of the Phy rate and theoretical value of IP layer maximum effective rate (MTU1514B) for each of the circuits, i.e., 10Base-T, 100Base-TX, 1000Base-T as shown in the figure, and can obtain the maximum effective rate from the Phy rate of the circuit actually used.

Figure 5:
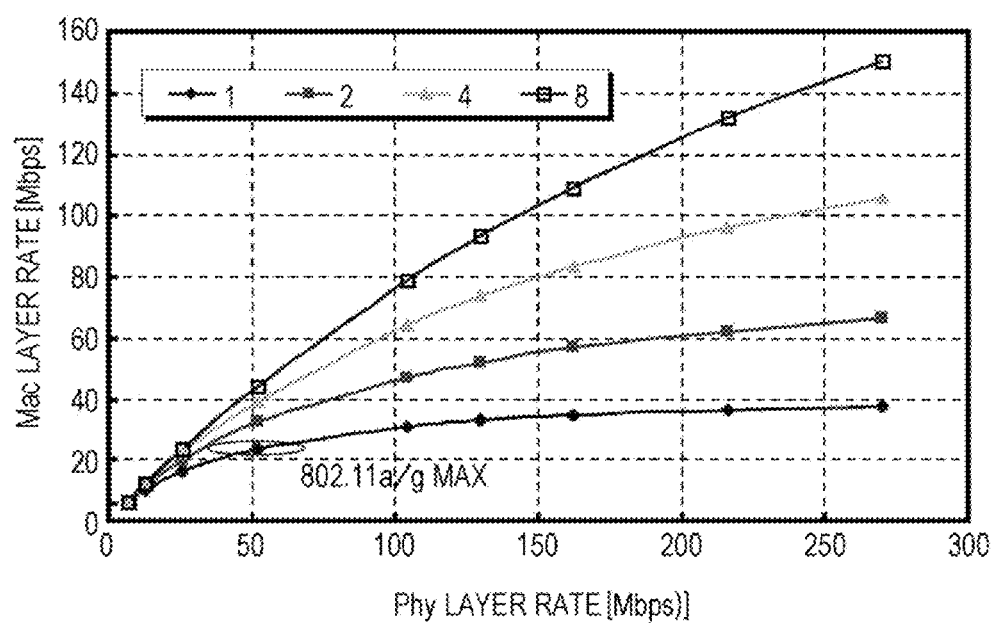
FIG. 5 is a figure illustrating an example of configuration of a maximum effective rate table using a theoretical value according to IEEE802.11 technology.

FIG. 5 illustrates an example of configuration of a maximum effective rate table using a theoretical value according to IEEE802.11 technology. The maximum effective table describes correspondence relationship between the Phy rate and the maximum effective rate (case where RTS/CTS procedure is included) for each number of packets aggregated. The transmission unit can obtain the maximum effective rate from the Phy rate of the circuit actually used, on the basis of the maximum effective rate table from the Phy rate and the aggregation number with which the packets are actually transmitted.

Figure 6:
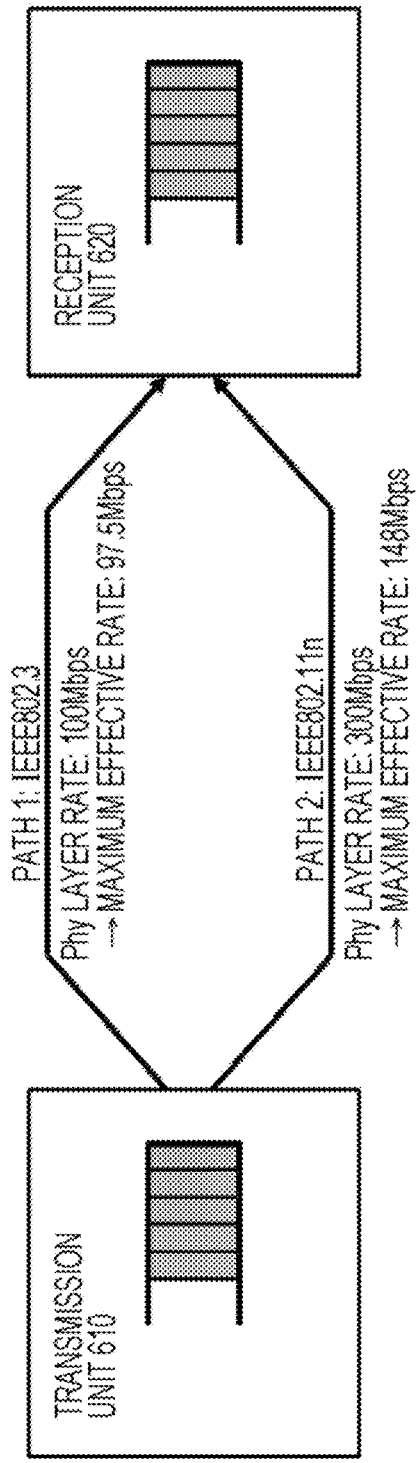
FIG. 6 is a figure for explaining a first method for estimating a maximum effective rate from Phy rate.

FIG. 6 illustrates the first method for the estimating maximum effective rate from the Phy rate. In this case, there are the path 1 which directly connects a transmission unit 610 and a reception unit 620 according to IEEE802.3 technology and the path 2 which directly connects the transmission unit 610 and the reception unit 620 according to IEEE802.11 technology (IEEE802.11n).

The transmission unit 610 has a maximum effective rate table for each circuit. Therefore, by looking up the maximum effective rate table as illustrated in FIG. 4, a maximum effective rate of 97.5 Mbps can be obtained from a Phy rate of 100 Mbps at which the packets are actually transmitted to the path 1. The transmission unit 610 looks up the maximum effective rate table as illustrated in FIG. 5, thereby obtaining a maximum effective rate of 148 Mbps according to a Phy rate of 300 Mbps and the aggregation number with which the packets are actually transmitted to the path 2.

When the transmission unit 610 measures the maximum effective rate for each of the multiple paths between the transmission unit 610 and the reception unit 620 according to the above estimation method, the transmission unit 610 selects a path on the basis of the information.

A-3. Method for Estimating Maximum Effective Rate from Phy Rate (2)

Subsequently, the second method for estimating the maximum effective rate of the path between the transmission unit and the reception unit from Phy rate will be explained.

It should be noted that the second method explained here can be applied to a case where both of the transmission unit and the reception unit are connected to the same access point in infrastructure mode of IEEE802.11. However, it is to be understood that, in a direct path based on TDLS between the transmission unit and the reception unit and a path from the transmission unit to the access point, the maximum effective rate is estimated based on the first method for performing estimation from the Phy rate as described above. Therefore, the main feature of the second method lies in a method in which the transmission unit estimates the maximum effective rate from the access point to the reception unit.

In order to achieve this estimation method, the transmission unit includes a maximum effective rate table describing correspondence relationship Phy rate and the maximum effective rate for each L2 technique.

As described above, the maximum effective rate table may use theoretical values. For example, in a case of 100Base-Tx, where the Phy rate is 100 Mbps, and the MTU is 1514 bytes, the maximum effective rate in IP layer is as follows: 100 Mbps×(1500/(1514+24))=97.5 Mbps. In IEEE802.11 technology, a theoretical value can also be calculated from an MTU, an aggregate number of packets, and a parameter indicating presence/absence of RTS/CTS which can be obtained by the host. As described above, measurement result values at a laboratory may be used as the maximum effective rate table.

The transmission unit receives not only those transmitted to the transmission unit itself but also signals transmitted from the access point to the reception unit, and determines the Phy rate between the access point and the reception unit. When the transmission unit and the reception unit have the same reception performance, the following can be said: as long as the access point can communicate with the reception unit, the transmission unit basically can also receive the signal.

Then, the transmission unit obtains the maximum effective rate of the path between the access point and the reception unit by looking up the maximum effective rate table (see FIG. 5) explained above from the Phy rate between the access point and the reception unit thus determined. The obtained maximum effective rate is defined as X [Mbps].

The transmission unit also estimates the maximum effective rate of the path between the transmission unit and the access point on the basis of the first method for performing estimation from the Phy rate. The estimated maximum effective rate is defined as Y [Mbps].

Accordingly, the transmission unit can determine the total maximum effective rate between the transmission unit and the reception unit by way of the access point. When the frequency of the communication between the transmission unit and the access point and the frequency of the communication between the access point and the reception unit belong to the same frequency, the total maximum effective rate is calculated as an average value of X and Y according to the following expression (2). When the frequency of the communication between the transmission unit and the access point and the frequency of the communication between the access point and the reception unit belong to different frequencies, the total maximum effective rate is calculated as any one of X and Y whichever is smaller according to the following expression (3).

[Math 2]

$$\text{maximum effective rate} = X \times Y/(X+Y) [\text{Mbps}] \quad (2)$$

[Math 3]

$$\text{maximum effective rate} = \min(X, Y) [\text{Mbps}] \quad (3)$$

For example, when the link adaptation function is applied to at least one of the path between the transmission unit and the access point and the path between the access point and the reception unit, the transmission unit obtains the Phy rate with a regular interval of time, and dynamically finds the total maximum effective rate.

According to the second method in which the maximum effective rate of the path between the transmission unit and the reception unit is estimated from the Phy rate explained above, the transmission unit can also estimate the maximum effective rate of a path beyond the access point. Even if the technique disclosed in this specification is not applied to the reception unit, the transmission unit can estimate the total maximum effective rate.

When the transmission unit measures the maximum effective rate for each of the multiple paths between the transmission unit and the reception unit according to the above estimation method, the transmission unit selects a path on the basis of the information.

Figure 7:
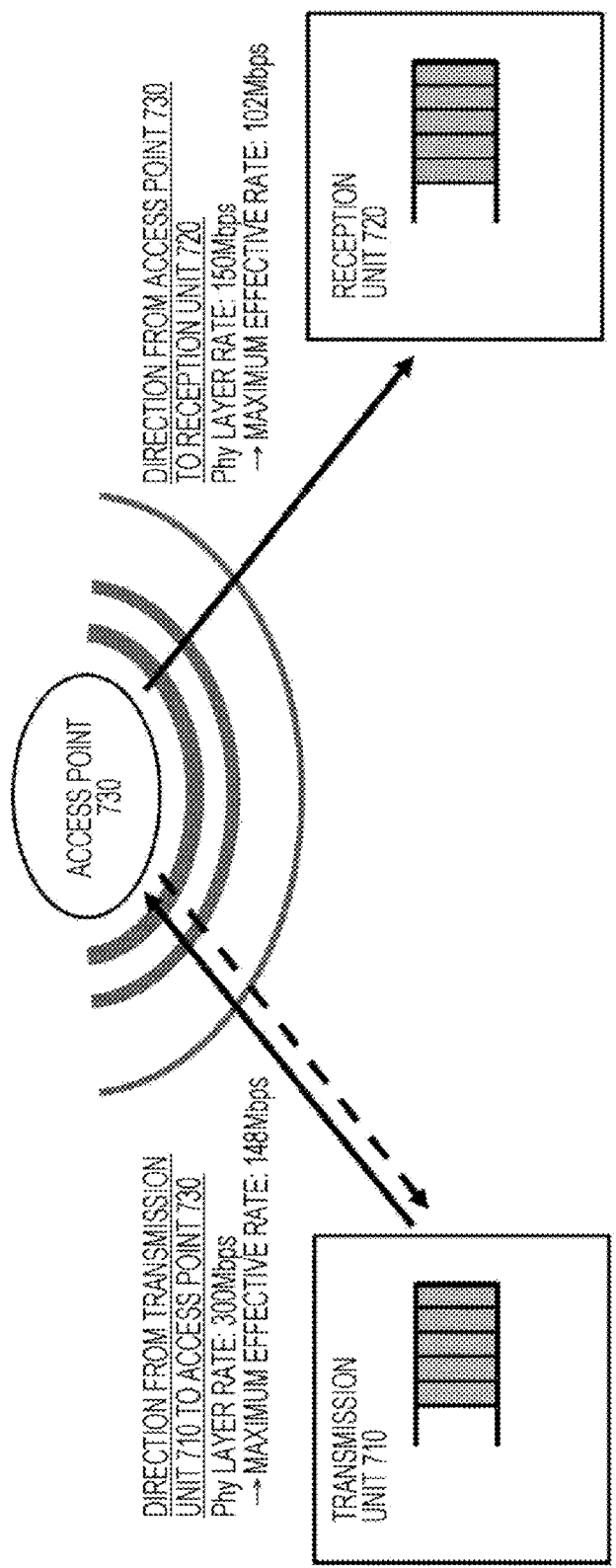
FIG. 7 is a figure for explaining a second method for estimating a maximum effective rate from Phy rate.

FIG. 7 illustrates the second method for the estimating maximum effective rate from the Phy rate. In the example in the figure, both of a transmission unit 710 and a reception unit 720 connected to the same access point 730 in infrastructure mode of IEEE802.11n.

The transmission unit 710 has the maximum effective rate table as illustrated in FIG. 5. The transmission unit 710 already knows the Phy rate when the transmission unit 710 itself actually transmits packets to the access point 730. Therefore, by looking up the maximum effective rate table as illustrated in FIG. 5, a maximum effective rate Y [Mbps] according to the Phy rate and the Aggregate number is obtained.

The transmission unit 710 receives signals transmitted from the access point 730 to the reception unit 720, and determines the Phy rate between the access point 730 and the reception unit 720. Then, the transmission unit 710 obtains the maximum effective rate X [Mbps] according to the Phy rate and the Aggregate number by looking up the maximum effective rate table as illustrated in FIG. 5.

More specifically, the transmission unit 710 obtains a maximum effective rate of 148 Mbps by looking up the maximum effective rate table from a Phy rate of 300 Mbps and the Aggregate number with which the transmission unit 710 actually transmits packets to the access point 730. The transmission unit 710 receives signals transmitted from the access point 730 to the reception unit 720, and obtains a maximum effective rate of 102 Mbps by looking up the maximum effective rate table from a Phy rate 150 Mbps and the Aggregate number.

In this case, when the frequency of the communication between the transmission unit 710 and the access point 730 and the frequency of the communication between the access point 730 and the reception unit 720 belong to the same frequency, the total maximum effective rate is calculated according to the following expression (4). When the frequency of the communication between the transmission unit 710 and the access point 730 and the frequency of the communication between the access point 730 and the reception unit 720 belong to different frequencies, the total maximum effective rate is calculated according to the following expression (5).

[Math 4]

$$\text{maximum effective rate} = 148 \times 102/(148+102) = 60.384 [\text{Mbps}] \quad (4)$$

[Math 5]

$$\text{maximum effective rate} = \min(148, 102) = 102 [\text{Mbps}] \quad (5)$$

When the transmission unit 710 measures the maximum effective rate for each of the multiple paths between the transmission unit 710 and the reception unit 720 according to the above estimation method, the transmission unit 710 selects a path on the basis of the information.

A-4. Method for Estimating Maximum Effective Rate from Phy Rate (3)

Subsequently, the third method for estimating the maximum effective rate of the path between the transmission unit and the reception unit from Phy rate will be explained.

It should be noted that the third method explained here can be applied to a case where both of the transmission unit and the reception unit are connected to the same access point in infrastructure mode of IEEE802.11. However, it is to be understood that, in a direct path based on TDLS between the transmission unit and the reception unit and a path from the transmission unit to the access point, the maximum effective rate is estimated based on the first method for performing estimation from the Phy rate as described above. Therefore, like the second method, the main feature of the third method lies in a method in which the transmission unit estimates the maximum effective rate from the access point to the reception unit.

In order to achieve this estimation method, the transmission unit includes a maximum effective rate table describing correspondence relationship Phy rate and the maximum effective rate for each L2 technique.

As described above, the maximum effective rate table may use theoretical values. For example, in a case of 100Base-Tx, where the Phy rate is 100 Mbps, and the MTU is 1514 bytes, the maximum effective rate in IP layer is as follows: 100 Mbps×(1500/(1514+24))=97.5 Mbps. In IEEE802.11 technology, a theoretical value can also be calculated from an MTU, an aggregate number of packets, and a parameter indicating presence/absence of RTS/CTS which can be obtained by the host. As described above, measurement result values at a laboratory may be used as the maximum effective rate table.

First, a control session is established in a path between the transmission unit and the reception unit, of which maximum effective rate is to be measured. When there is a path in which a control session cannot be established, the fact itself that the session cannot be established is the information about the maximum effective rate.

When the reception unit obtains the Phy rate of the signal received from the access point in the control session, the reception unit transmits information about the Phy rate to the transmission unit via the control session. The reception unit also transmits the used frequency information.

On the other hand, when the transmission unit receives the information about the Phy rate from the reception unit, the transmission unit looks up the maximum effective rate table explained above, and obtains the maximum effective rate of the path between the access point and the reception unit on the basis of the information about the Phy rate. The obtained maximum effective rate is defined as X [Mbps].

Alternatively, when the reception unit holds the maximum effective rate table as illustrated in FIG. 5 and can estimate the maximum effective rate, the estimated maximum effective rate may be transmitted instead of the information about the Phy rate. In this case, the maximum effective rate received by the transmission unit is defined as X [Mbps].

The transmission unit also estimates the maximum effective rate of the path between the transmission unit and the access point on the basis of the first method for performing estimation from the Phy rate. The estimated maximum effective rate is defined as Y [Mbps].

Accordingly, the transmission unit can determine the total maximum effective rate between the transmission unit and the reception unit by way of the access point. When the frequency of the communication between the transmission unit and the access point and the frequency of the communication between the access point and the reception unit belong to the same frequency, the total maximum effective rate is calculated according to the above expression (2). When the frequency of the communication between the transmission unit and the access point and the frequency of the communication between the access point and the reception unit belong to different frequencies, the total maximum effective rate is calculated according to the above expression (3).

For example, when the link adaptation function is applied to at least one of the path between the transmission unit and the access point and the path between the access point and the reception unit, the transmission unit obtains the Phy rate with a regular interval of time, and dynamically finds the total maximum effective rate.

According to the second method in which the maximum effective rate of the path between the transmission unit and the reception unit is estimated from the Phy rate explained above, the transmission unit can also estimate the maximum effective rate of a path beyond the access point.

When the transmission unit measures the maximum effective rate for each of the multiple paths between the transmission unit and the reception unit according to the above estimation method, the transmission unit selects a path on the basis of the information.

Figure 8:
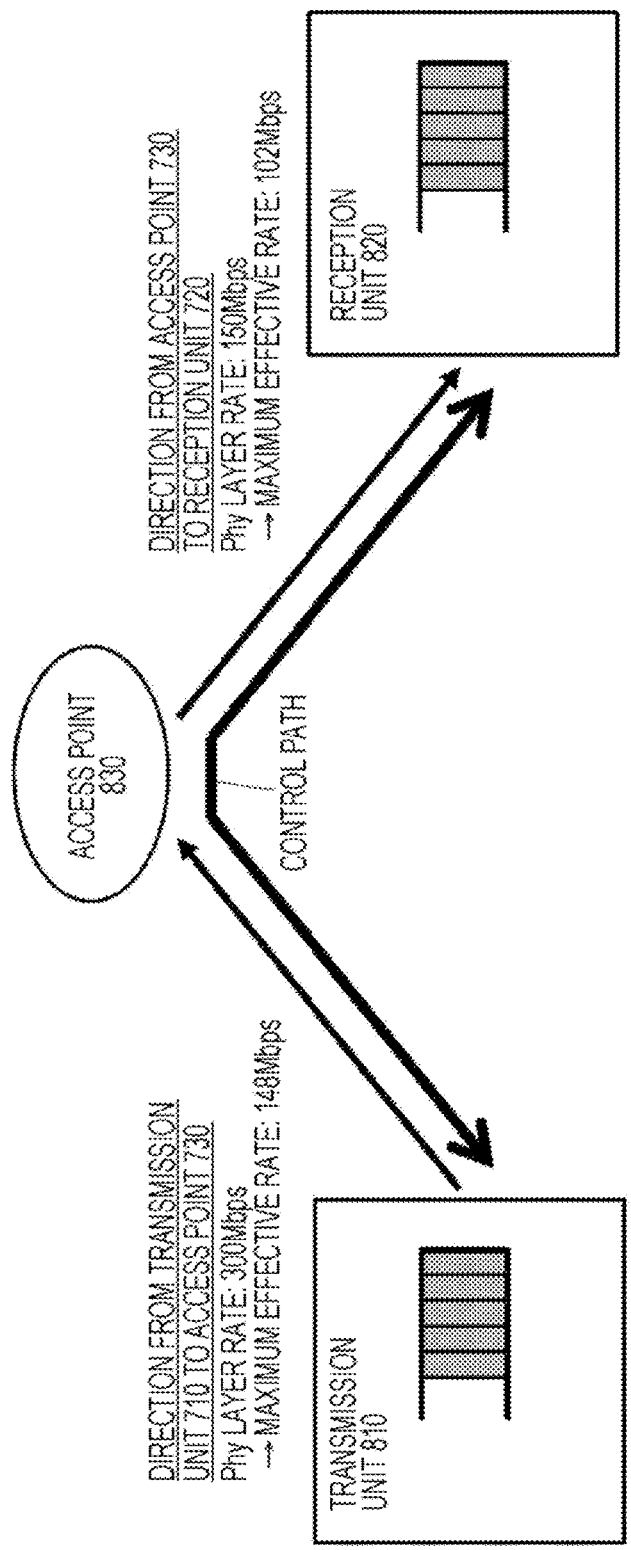
FIG. 8 is a figure for explaining a third method for estimating a maximum effective rate from Phy rate.

FIG. 8 illustrates the third method for the estimating maximum effective rate from the Phy rate. In this case, both of a transmission unit 810 and a reception unit 820 connected to the same access point 830 in infrastructure mode of IEEE802.11n.

The transmission unit 810 has the maximum effective rate table as illustrated in FIG. 5. The transmission unit 810 already knows the Phy rate when the transmission unit 810 itself actually transmits packets to the access point 830.

A control session is established in the path between the transmission unit 810 and the reception unit 820 of which maximum effective rate is to be measured, so that a control path is made. When the reception unit 820 obtains the Phy rate of the signal received from the access point 830 in the control session, the reception unit transmits information about the Phy rate to the transmission unit 810 via the control session. The reception 820 also transmits the used frequency information to the transmission unit 810.

Accordingly, when the transmission unit 810 receives the information about the Phy rate from the reception unit 820, the transmission unit 810 obtains the maximum effective rate according to the Phy rate and the Aggregate number by looking up the maximum effective rate table as illustrated in FIG. 5.

More specifically, the transmission unit 810 obtains a maximum effective rate of 148 Mbps by looking up the maximum effective rate table from a Phy rate of 300 Mbps and the Aggregate number with which the transmission unit 810 actually transmits packets to the access point 830. The transmission unit 810 obtains a maximum effective rate of 102 Mbps by looking up the maximum effective rate table from the Phy rate 150 Mbps and the Aggregate number received from the reception unit 820 via the control session.

In this case, when the frequency of the communication between the transmission unit 810 and the access point 830 and the frequency of the communication between the access point 830 and the reception unit 820 belong to the same frequency, the total maximum effective rate is calculated according to the following expression (6). When the frequency of the communication between the transmission unit 810 and the access point 830 and the frequency of the communication between the access point 830 and the reception unit 820 belong to different frequencies, the total maximum effective rate is calculated according to the following expression (7).

[Math 6]

$$\text{maximum effective rate} = 148 \times 102/(148+102) = 60.384 \text{ [Mbps]} \quad (6)$$

[Math 7]

$$\text{maximum effective rate} = \min(148, 102) = 102 \text{ [Mbps]} \quad (7)$$

When the transmission unit 810 measures the maximum effective rate for each of the multiple paths between the transmission unit 810 and the reception unit 820 according to the above estimation method, the transmission unit 810 selects a path on the basis of the information.

Figure 9:
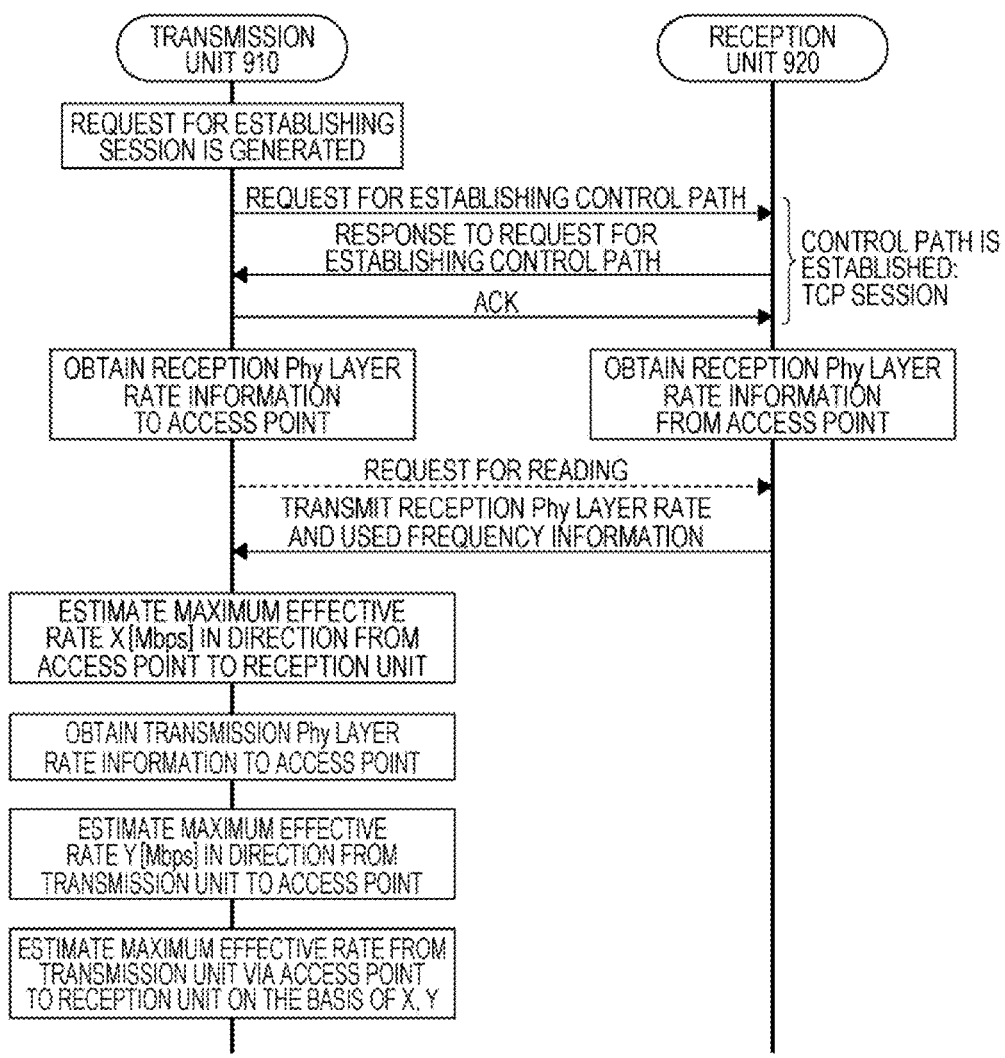
FIG. 9 is a figure illustrating a communication sequence example executed between a transmission unit and a reception unit to estimate a maximum effective rate from Phy rate.

FIG. 9 illustrates a communication sequence example executed between a transmission unit 910 and a reception unit 920 to estimate a maximum effective rate from Phy rate according to the third method.

When session establishing request with the reception unit 920 occurs, the transmission unit 910 transmits a control path establishing request message to the reception unit 920. Then, the reception unit 920 replies this control path establishing response message, and further the transmission unit 910 transmits ACK, so that TCP session of a control path between the transmission unit 910 and the reception unit 920 is established.

The transmission unit 910 uses the control path and obtains Phy rate information with which the packets are actually transmitted to the access point 930. On the other hand, the reception unit 920 obtains the Phy rate of the signal received from the access point 930 via the control path. Then, for example, the reception unit 920 responds to a read request message from the transmission unit 910, and transmits the information about the received Phy rate as well as the information about the used frequency to the transmission unit 910.

When the transmission unit 910 receives the information about the Phy rate from the reception unit 920, the transmission unit 910 looks up the maximum effective rate table explained above, and obtains the maximum effective rate of the path between the access point 930 and the reception unit 920 on the basis of the information about the Phy rate. The obtained maximum effective rate is defined as X [Mbps].

The transmission unit 910 also estimates the maximum effective rate of the path between the transmission unit 910 and the access point 930 from the transmission Phy rate of itself on the basis of the first method for performing estimation from the Phy rate. The estimated maximum effective rate is defined as Y [Mbps].

Then, the transmission unit 910 estimates the maximum effective rate of the path from the transmission unit 910 via the access point 930 to the reception unit 920 on the basis of X and Y explained above.

A-5. Method for Estimating Maximum Effective Rate from Received Power (1)

Subsequently, the first method for estimating the maximum effective rate of the path between the transmission unit and the reception unit from the received power will be explained. It should be noted that the method explained here can be applied to a case where the transmission unit and the reception unit are directly connected. More specifically, this is a case where, according to IEEE802.11 technology, any one of the terminals of the transmission unit and the reception unit directly connected using Wi-Fi Direct, TDLS, Ad-hoc, or any one of the transmission unit and the reception unit serves as an access point, and direct connection is made therebetween.

In order to achieve this estimation method, the transmission unit holds a correspondence table of the received power level and the maximum effective rate for each parameter including the supported maximum stream number, whether the aggregation of packets is effective or not effective, the aggregation maximum size, the MTU length, the protocol, and the frequency. This table is made by a designer in advance through measurement based on an actual apparatus.

The transmission unit measures the received power level of the signal from the reception unit. Even when only the communication from the transmission unit to the reception unit exists in the IP layer or above, the ACK signal of L2 layer is replied from the reception unit to the transmission unit. Therefore, transmission unit may measure the received power level of the ACK signal from the reception unit.

Further, the transmission unit obtains other transmission parameters such as the supported maximum stream number, whether the aggregation is effective or not, the aggregation maximum size, the MTU length, the protocol (UDP/TCP), and the frequency. This is because, with such transmission parameters, the relationship between the received power and the maximum effective rate may change.

The transmission unit assumes that the received power level, and other transmission parameter thus obtained are the reception parameters, and accordingly, by looking up the correspondence table explained above, obtains the estimation value of the maximum effective rate. Then, the transmission unit uses the obtained maximum effective rate as a value for transmission.

According to such estimation method of the maximum rate, even if the technique disclosed in this specification is not applied to the reception unit, the transmission unit can estimate the total maximum effective rate.

When the transmission unit measures the maximum effective rate for each of the multiple paths between the transmission unit and the reception unit according to the above estimation method, the transmission unit selects a path on the basis of the information.

Figure 10:
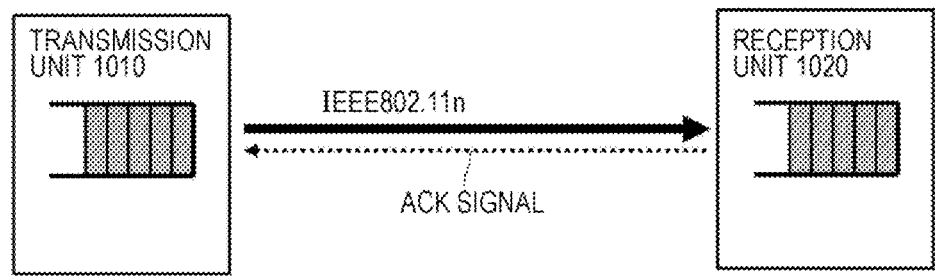
FIG. 10 is a figure for explaining a first method for estimating a maximum effective rate from a received power.

FIG. 10 illustrates the first method for the estimating maximum effective rate from the received power. In the example in the figure, according to IEEE802.11n, a transmission unit 1010 and a reception unit 1020 are directly connected by any one of Wi-Fi Direct, TDLS, Ad-hoc, or any one of the terminals serves as an access point, and the terminals are directly connected.

Figure 11:
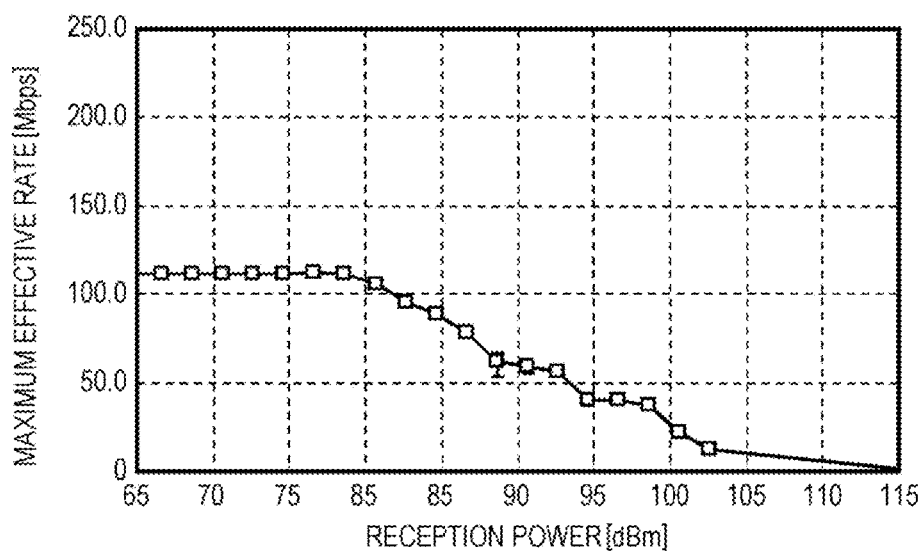
FIG. 11 is a figure illustrating an example of correspondence table between a received power and a maximum effective rate (throughput).

The transmission unit 1010 holds a correspondence table of the received power level and the maximum effective rate for each parameter including the supported maximum stream number, whether the aggregation of packets is effective or not effective, the aggregation maximum size, the MTU length, the protocol, and the frequency. FIG. 11 illustrates an example of correspondence table of the received power and the maximum effective rate (throughput) (however, supported maximum stream number is 2, used protocol is UDP, aggregation maximum size is 8, and used frequency channel is 1).

For example, the transmission unit 1010 measures the received power level of an ACK signal from the reception unit 1020. In FIG. 10, a signal from the reception unit 1020 is represented by an arrow of dotted line. Then, the transmission unit 1010 determines the maximum effective rate for transmission by looking up the correspondence table as illustrated in FIG. 11 (corresponding to the transmission parameters) from the obtained received power level.

When the transmission unit 1010 determines the maximum effective rate for each of the multiple paths between the transmission unit 1010 and the reception unit 1020 according to the above estimation method, the transmission unit 1010 selects a path on the basis of the information.

A-6. Method for Estimating Maximum Effective Rate from Received Power (2)

Subsequently, the second method for estimating the maximum effective rate of the path between the transmission unit and the reception unit from the received power will be explained. It should be noted that the method explained here can be applied to a case where the transmission unit and the reception unit are directly connected. More specifically, this is a case where, according to IEEE802.11 technology, any one of the terminals of the transmission unit and the reception unit directly connected using Wi-Fi Direct, TDLS, Ad-hoc, or any one of the transmission unit and the reception unit serves as an access point, and direct connection is made therebetween.

In order to achieve this estimation method, the reception unit holds a correspondence table of the received power level and the maximum effective rate for each parameter including the supported maximum stream number, whether the aggregation of packets is effective or not effective, the aggregation maximum size, the MTU length, the protocol, and the frequency. An example of correspondence table is what is shown in FIG. 11. This table is made by a designer in advance through measurement based on an actual apparatus.

First, a control session is established in a path between the transmission unit and the reception unit, of which maximum effective rate is to be measured. When there is a path in which a control session cannot be established, the fact itself that the session cannot be established is the information about the maximum effective rate.

The reception unit measures the received power level of the signal from the transmission unit. Further, the reception unit obtains other transmission parameters such as the supported maximum stream number, whether the Aggregate is effective or not, the Aggregate maximum size, the MTU length, the protocol (UDP/TCP), and the frequency. This is because, with such transmission parameters, the relationship between the received power and the maximum effective rate may change.

The reception unit assumes that the received power level, and other transmission parameter thus obtained are the reception parameters, and accordingly, by looking up the correspondence table, can obtain the estimation value of the maximum effective rate. This value is determined to be an estimation value of the maximum effective rate from the transmission unit to the reception unit. The reception unit transmits the determined value to the transmission unit using the control session. Then, the transmission unit uses the obtained maximum effective rate as a value for transmission.

When the transmission unit measures the maximum effective rate for each of the multiple paths between the transmission unit and the reception unit according to the above estimation method, the transmission unit selects a path on the basis of the information.

Figure 12:
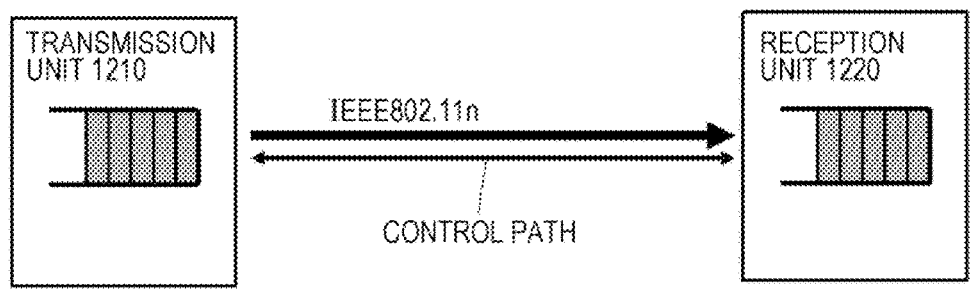
FIG. 12 is a figure for explaining a second method for estimating a maximum effective rate from a received power.

FIG. 12 illustrates the first method for the estimating maximum effective rate from the received power. In the example in the figure, according to IEEE802.11n, a transmission unit 1210 and a reception unit 1220 are directly connected by any one of Wi-Fi Direct, TDLS, Ad-hoc, or any one of the terminals serves as an access point, and the terminals are directly connected.

The reception unit 1220 holds a correspondence table (see FIG. 11) of the received power level and the maximum effective rate for each parameter including the supported maximum stream number, whether the Aggregate of packets is effective or not effective, the Aggregate maximum size, the MTU length, the protocol, and the frequency.

A control session is established in the path between the transmission unit 1210 and the reception unit 1220 of which maximum effective rate is to be measured, so that a control path is made. In FIG. 12, a control path is represented by an arrow of dotted line. The reception unit 1220 measures the received power of the signal from the transmission unit 1210 in the control session.

Then, when the reception unit 1220 determines the maximum effective rate for transmission by looking up the correspondence table as illustrated in FIG. 11 (corresponding to the transmission parameters) from the obtained received power level, the reception unit 1220 uses the control session to transmit the estimation value of the maximum effective rate thus determined to the transmission unit 1210.

When the transmission unit 1210 determines the maximum effective rate for each of the multiple paths between the transmission unit 1210 and the reception unit 1220 according to the above estimation method, the transmission unit 1210 selects a path on the basis of the information.

Figure 13:
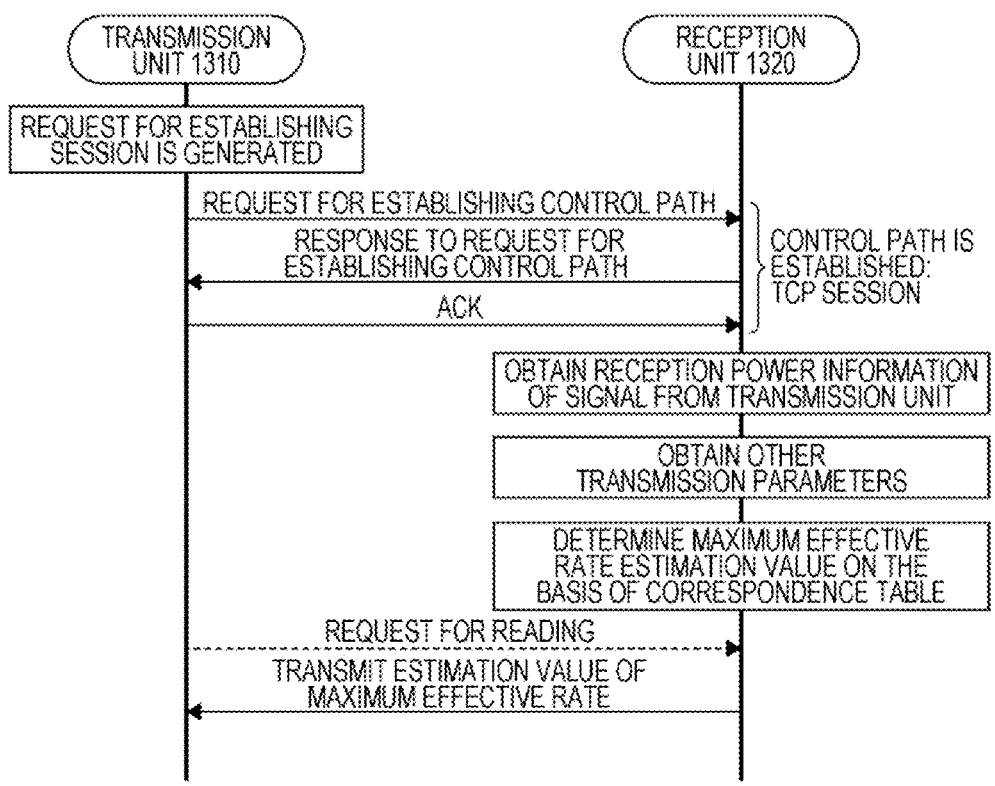
FIG. 13 is a figure illustrating a communication sequence example executed between a transmission unit and a reception unit to estimate a maximum effective rate from a received power level.

FIG. 13 illustrates a communication sequence example executed between a transmission unit 1310 and a reception unit 1320 to estimate a maximum effective rate from Phy rate according to the third method.

When session establishing request with the reception unit 1320 occurs, the transmission unit 1310 transmits a control path establishing request message to the reception unit 1320. Then, the reception unit 1320 replies this control path establishing response message, and further the transmission unit 1310 transmits ACK, so that TCP session of a control path between the transmission unit 1310 and the reception unit 1320 is established.

The reception unit 1320 measures the received power level of the signal from the transmission unit 1310. The reception unit 1320 obtains other transmission parameters such as the supported maximum stream number, whether the Aggregate is effective or not, the Aggregate maximum size, the MTU length, the protocol (UDP/TCP), and the frequency.

The reception unit 1320 assumes that the received power level, and other transmission parameter thus obtained are the reception parameters, and accordingly, by looking up the correspondence table (see FIG. 11), can obtain the estimation value of the maximum effective rate. This value is determined to be an estimation value of the maximum effective rate from the transmission unit 1310 to the reception unit 1320. Then, for example, in reply to the read request message from the transmission unit 1310, the reception unit 1320 transmits the determined value to the transmission unit 1310 using the control session.

A-7. Method for Estimating Maximum Effective Rate from Phy Rate and Statistics Information Subsequently, the first method for estimating the maximum effective rate of the path between the transmission unit and the reception unit from Phy rate and statistics information will be explained. It should be noted that the method explained here can be applied to a case where the transmission unit and the reception unit are directly connected. The following examples will be shown as cases where the transmission unit and the reception unit are directly connected.

(1) A case where, according to IEEE802.11 technology, direct connection is made using Wi-Fi Direct, TDLS, Ad-hoc, or any one of the transmission unit and the reception unit serves as an access point, and direct connection is made therebetween (2) A case where the terminals of both of the transmission unit and the reception unit are connected to the same power line in PLC (3) A case where the terminals of both of the transmission unit and the reception unit are connected to the same topology with coaxial lines (4) The terminals of both of the transmission unit and the reception unit are directly connected without relying on any switch in IEEE802.3 technology In order to achieve this estimation method, the transmission unit includes a maximum effective rate table describing correspondence relationship Phy rate and the maximum effective rate for each L2 technique.

In this case, the maximum effective rate table may use theoretical values. For example, in a case of 100Base-Tx, where the Phy rate is 100 Mbps, and an MTU (Max Transfer Unit), i.e., the maximum packet size that can be handled in IP layer is 1514 bytes, the maximum effective rate in IP layer is as follows: 100 Mbps×(1500/(1514+24))=97.5 Mbps. In IEEE802.11 technology, a theoretical value can also be calculated from an MTU, an aggregate number of packets, and a parameter indicating presence/absence of RTS/CTS which can be obtained by the host. Alternatively, measurement result values at a laboratory may be used as the maximum effective rate table.

The transmission unit looks up the maximum effective rate table from the Phy rate at which the transmission unit transmits a packet, and obtains the maximum effective rate of each path.

The transmission unit reads the statistics information, and obtains a normal transmission completion packet number and a transmission failure packet number in the past Z seconds at the Phy rate, and calculates a normal transmission rate at the Phy rate in question as the statistics information according to the following expression (8).

[Math 8]

[normal transmission rate]=[normal transmission completion packet number]/([normal transmission completion packet number]+[transmission failure packet number])   (8)

If, at this occasion, statistics about the normal transmission rate for each Phy rate during transmission are obtained, the calculation of the above expression (8) uses the statistics about the normal transmission rate. In this case, the statistics information of the Phy rate actually transmitted is obtained.

Then, the transmission unit multiplies the maximum effective rate obtained from the Phy rate at which the transmission unit transmits a packet from itself by the normal transmission rate, and adopts the product of multiplication as the estimation value of the effective rate.

When the transmission unit measures the maximum effective rate for each of the multiple paths between the transmission unit and the reception unit according to the above estimation method, the transmission unit selects a path on the basis of the information.

Figure 14:
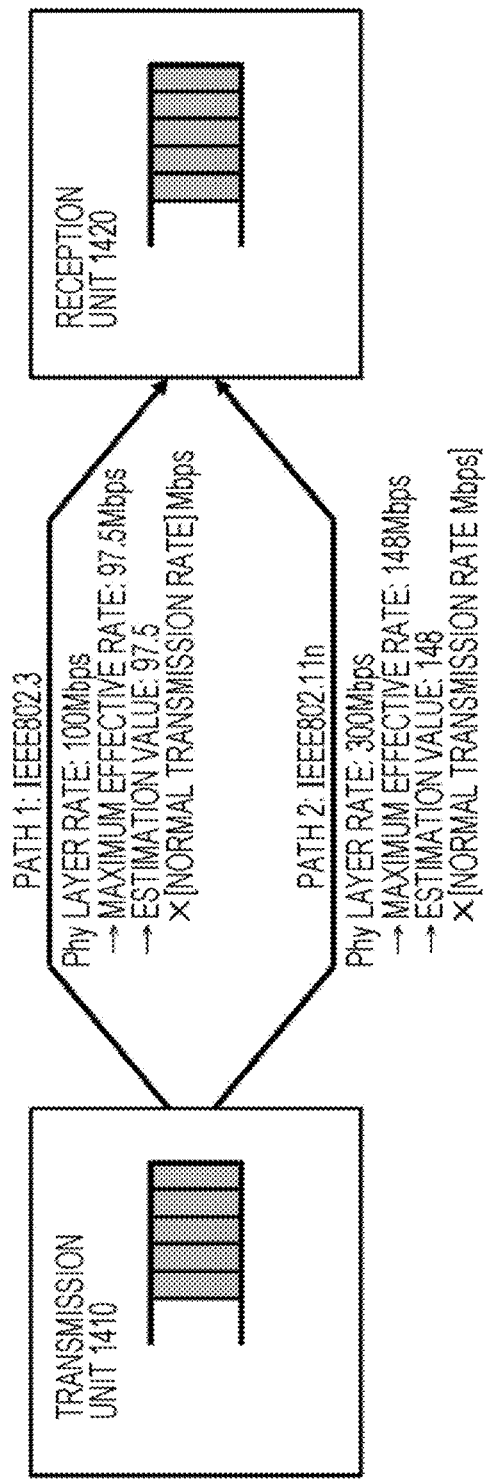
FIG. 14 is a figure for explaining a method for estimating a maximum effective rate of a path between a transmission unit and a reception unit from Phy rate and statistics information.

FIG. 14 illustrates a method for estimating a maximum effective rate of a path between a transmission unit and a reception unit from Phy rate and statistics information. In this case, there are the path 1 which directly connects a transmission unit 1410 and a reception unit 1420 according to IEEE802.3 technology and the path 2 which directly connects the transmission unit 1410 and the reception unit 1420 according to IEEE802.11 technology (IEEE802.11n).

The transmission unit 1410 has a maximum effective rate table for each circuit, as illustrated in FIGS. 4 and 5.

Therefore, by looking up the maximum effective rate table as illustrated in FIG. 4, the transmission unit 1410 obtains a maximum effective rate of 97.5 Mbps from a Phy rate of 100 Mbps at which the packets are actually transmitted to the path 1.

Subsequently, when the transmission unit 1410 reads the statistics information about itself concerning the path 1, and obtains a normal transmission completion packet number and a transmission failure packet number in the past Z seconds, then, the transmission unit 1410 calculates the normal transmission rate of the path 1 according to the above expression (8). Then, the maximum effective rate 97.5 Mbps is multiplied by the normal transmission rate, and the estimation value of the effective value of the path 1 is derived.

The transmission unit 1410 looks up the maximum effective rate table as illustrated in FIG. 5, and obtains a maximum effective rate of 148 Mbps according to a Phy rate of 300 Mbps and the Aggregate number with which the packets are actually transmitted to the path 2.

Subsequently, when the transmission unit 1410 reads the statistics information about itself concerning the path 2, and obtains a normal transmission completion packet number and a transmission failure packet number in the past Z seconds, then, the transmission unit 1410 calculates the normal transmission rate of the path 1 according to the above expression (8). Then, the maximum effective rate 97.5 Mbps is multiplied by the normal transmission rate, and the estimation value of the effective value of the path 1 is derived.

When the transmission unit 1410 measures the maximum effective rate for each of the multiple paths between the transmission unit 1410 and the reception unit 1420 according to the above estimation method using the statistics information, the transmission unit 610 selects a path on the basis of the information.

B. Path Selection Method

Subsequently, a method for selecting a path on the basis of the information about the maximum effective rate for each path estimated will be explained. The path selection method is roughly classified into a single selection method of selecting a single path and a multi-selection method of selecting multiple paths at a time. The single selection method can be further classified into an exclusive method for each session and a physically exclusive method. Any of the exclusive methods includes best effort method and QoS (Quality of Service) method. On the other hand, the multi-selection method includes weighting method and redundancy degree attaching method.

B-1. Single Selection Method for Each Session According to Best Effort Method

Hereinafter, a method for selecting a single path for each session with best effort in a case where there are multiple paths between a transmission unit and a reception unit will be explained.

More specifically, unit of session referred to herein corresponds to each session, application of TCP/UDP (multiple sessions of TCP/UDP which belong to the same application is collectively deemed as one unit). The communication in L2 that does not have the IP layer is deemed as one session for each unique set of MAC DA/SA.

The information collection method for path selection explained in the item A can be classified into a method for estimating remaining margin for the load of the path to which actually transmitted and a method with which it is impossible to perform estimation including the effect of the load actually transmitted. According to the measurement method of the effective rate explained in the item A-1, the remaining margin can be estimated. On the other hand, according to the measurement method of the effective rate explained in the items A-2 to A-7, it is impossible to perform estimation including the effect of the load actually transmitted.

B-1-1. A Case where Remaining Margin for the Load of the Path Through which Actual Transmission is Performed can be Estimated When the information collection method capable of estimating the remaining margin is applied, the maximum effective rate for each path is obtained, and on the basis of this, the estimation value of the remaining rate is obtained. Then, a path may be selected, which has the maximum remaining rate estimation value of the remaining rate estimation values obtained for the paths.

B-1-2. A Case where it is Impossible to Perform Estimation Including the Effect of the Load of the Path Through which Actual Transmission is Performed The processing procedure of path selection in a case where an information collection method that cannot perform estimation including the effect of the load actually transmitted is applied is shown as a form of flowchart in FIG. 15. This processing procedure is, for example, executed by the transmission unit.

First, expected (or, desired) effective rate of a session which is to be transmitted is obtained (step S1501). If it cannot be obtained, this processing is skipped.

Subsequently, for example, the estimation value of the maximum effective rate of each path is obtained according to the method explained in any one of the items A-2 to A-7 (step S1502). Then, the obtained maximum effective rate is temporarily adopted as the remaining rate estimation value of each path (step S1503).

In this case, when there is another session in which transmission is already performed, the effective rate of the session by which such transmission is performed is predicted for each path, and the summation of the predicted effective rates is calculated (step S1506). Then, for each path, processing is performed to subtract the predicted effective rate obtained in step S1506 from the estimation value of the maximum effective rate obtained in step S1502, and the remaining rate estimation value of the path is updated (step S1507). Such processing is performed on all the paths by which the transmission is already performed (steps S1504 to S1508).

Then, a path of which remaining rate estimation value is the maximum is exclusively selected a path of a session which is to be transmitted (step S1509).

Figure 16:
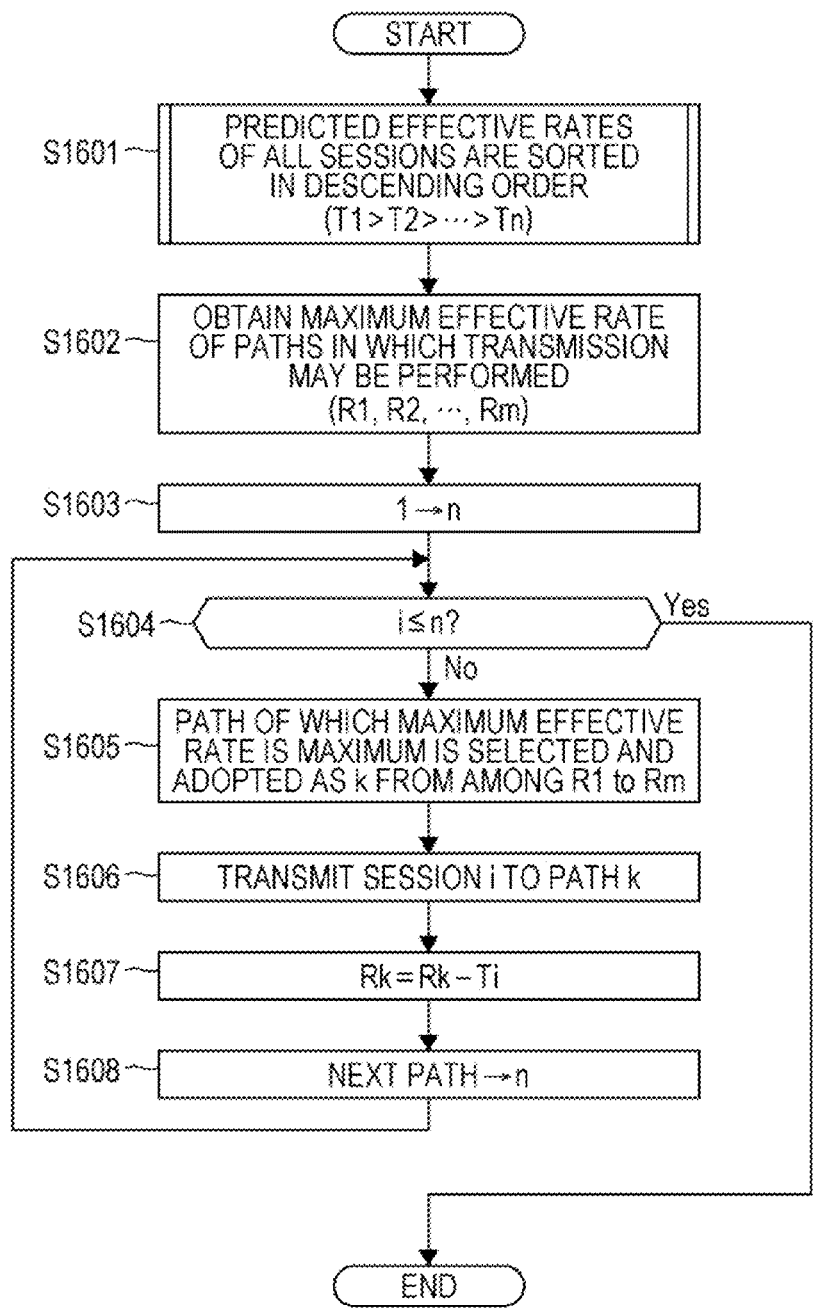
FIG. 16 is a flowchart illustrating another processing procedure of path selection in a case where an information collection method that cannot perform estimation including the effect of the load actually transmitted is applied.

When the predicted effective rate of each session is clear, the path selection can be done so that the load of each session is averaged every time the session is added. The processing procedure in this case is shown as a form of flowchart in FIG. 16. This processing procedure is, for example, executed by the transmission unit.

First, the predicted effective rates of the sessions are arranged in the descending order (step S1601). Suppose that, when there are n sessions of which paths are to be selected, the predicted effective rates are T1, T2, . . . , Tn, which are arranged in the descending order of the predicted effective rate.

Subsequently, for each path, the estimation value of the maximum effective rate without any load applied is obtained (step S1602). Suppose that there are m paths, the estimation values of the maximum effective rates of the paths are R1, R2, . . . , Rm, respectively.

Then, a path of which maximum effective rate is the maximum is selected from among R1 to Rm (step S1605), and a session of which predicted effective rate is the maximum, T1, is transmitted to the path (step S1606).

Where the estimation value of the maximum effective rate of the path k to which the session is transmitted in step S1606 is denoted as Rk, Rk is updated with Rk-T1 (step S1607).

As described above, the processing for transmitting the sessions to the path of which maximum effective rate is the maximum at that moment in the descending order of the predicted effective rate of the sessions is repeated until the path selection is finished for all the sessions (step S1603 to S1608).

B-2. Single Selection Method for Each Session According to QoS Method

Hereinafter, a method for selecting a single path for each session with QoS in a case where there are multiple paths between a transmission unit and a reception unit will be explained.

More specifically, unit of session referred to herein corresponds to each session, application of TCP/UDP (multiple sessions of TCP/UDP which belong to the same application is collectively deemed as one unit). The communication in L2 that does not have the IP layer is deemed as one session for each unique set of MAC DA/SA.

Figure 17:
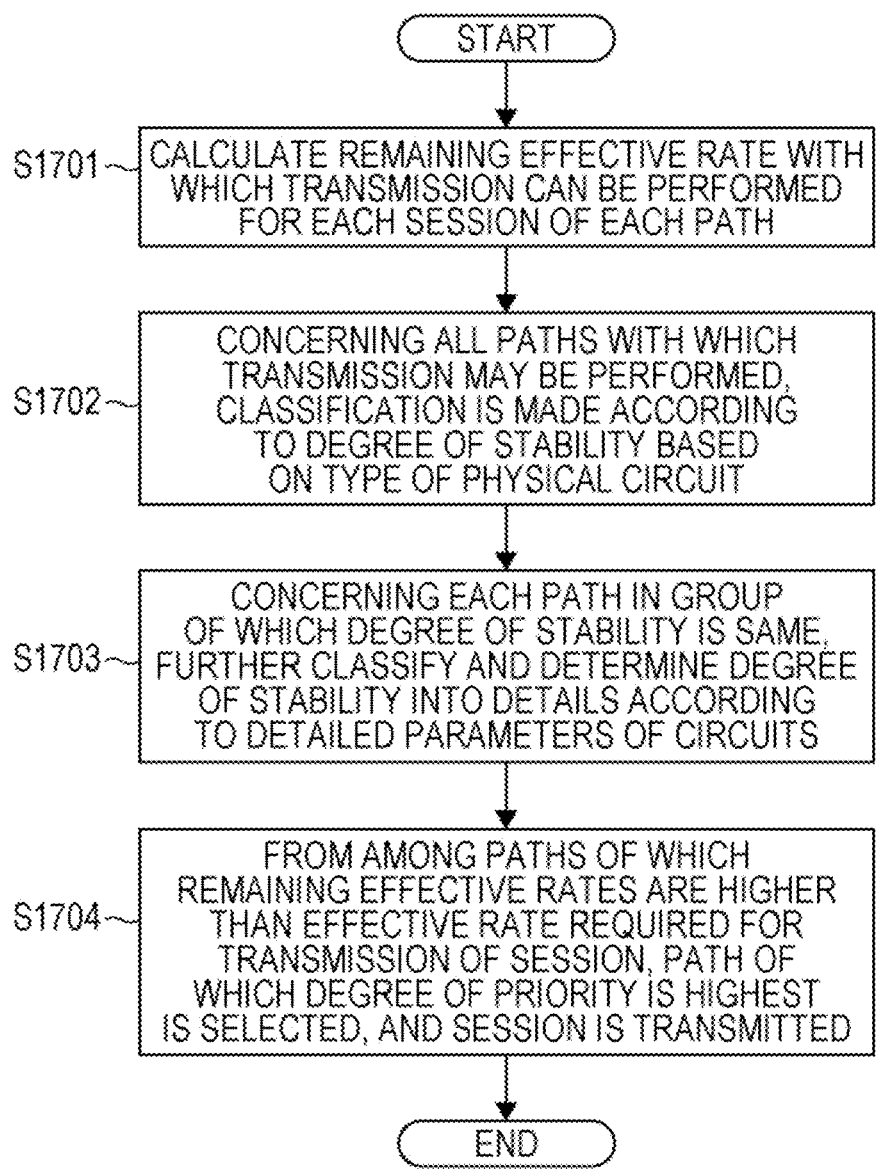
FIG. 17 is a flowchart illustrating processing procedure for selecting a single path for each session in view of QoS.

In FIG. 17, processing procedure for selecting a single path for each session in view of QoS is shown as a form of flowchart.

Figure 15:
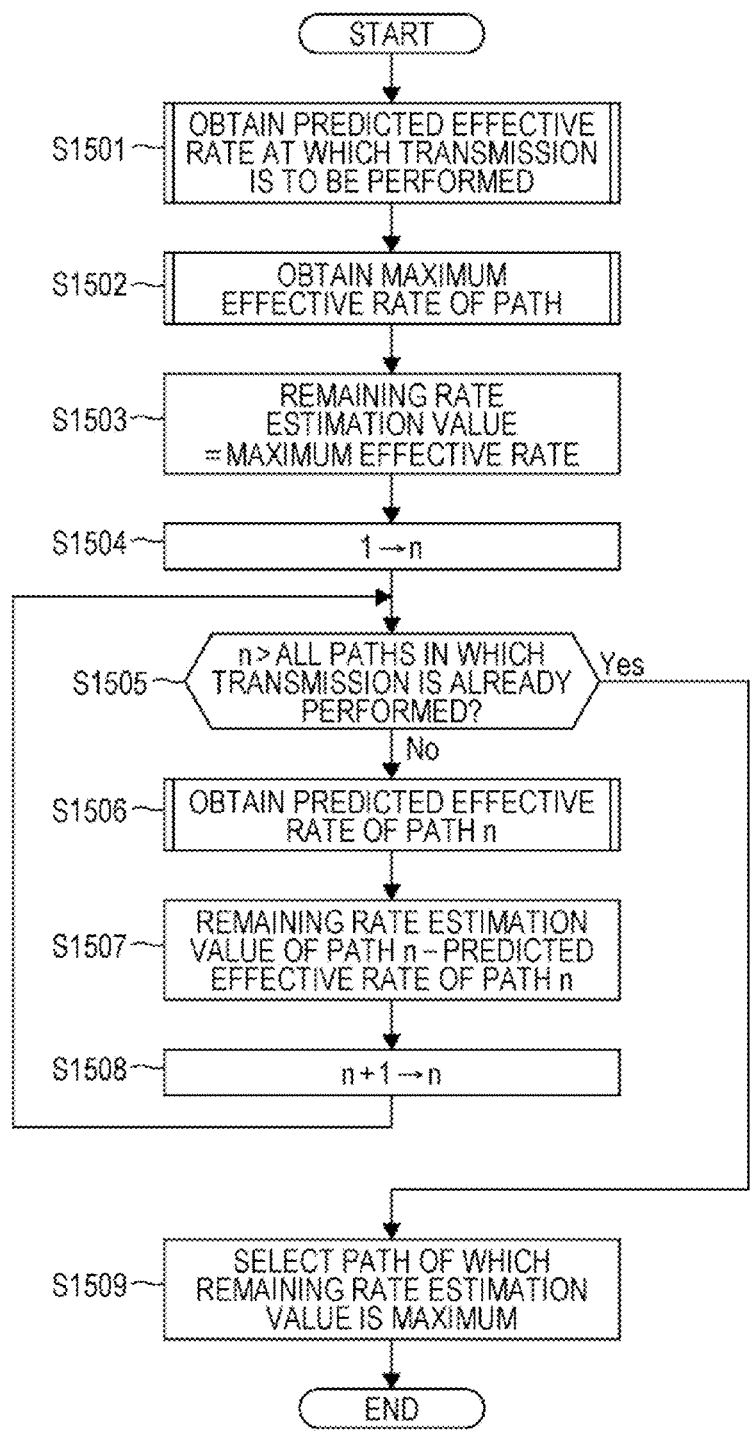
FIG. 15 is a flowchart illustrating processing procedure of path selection in a case where an information collection method that cannot perform estimation including the effect of the load actually transmitted is applied.

First, for example, according to the processing procedure as illustrated in FIG. 15, the remaining effective rate with which transmission can be performed for each session of each path (step S1701).

Subsequently, the physical method of each path is arranged in order from the perspective of transmission stability (step S1702).

The "transmission stability" referred to herein can be classified by the type of the physical circuit. For example, the transmission stability is higher in the following order: IEEE802.3>coaxial>Wi-Fi, PLC. The transmission stability can be classified within the same physical circuit. For example, in the case of IEEE802.3, the transmission stability is higher in the following order: 1000Base-T Full Duplex>100Base-TX Full Duplex>10Base-T Full Duplex>10BaseT Half Duplex. However, in the case of RF system (including coaxial, PLC system), a network having stabilization algorithm applied thereto is more stable in terms of transmission than best effort type networks. When the reception level is almost at the same level, lower Phy rate provides more stable transmission. A higher reception level provides more stable transmission than a lower reception level.

Alternatively, a user may give order of priority to the physical method of each path from the view point of transmission stability.

Subsequently, for each path in a group of which stability is the same, the stability is further classified and determined according to the detailed parameters of the circuit (step S1703).

Then, from among the paths of which remaining effective rates are higher than the effective rate required for transmission of the session, a path of which degree of priority given in the steps S1702 to S1703 is the highest (which means the highest degree of stability) is selected, and the session is transmitted (step S1704).

B-3. Single Selection Method for Each Logical Circuit According to Best Effort Method Hereinafter, a method for selecting a single path for each logical circuit with best effort in a case where there are multiple paths between a transmission unit and a reception unit will be explained.

In this case, first, for example, the estimation value of the maximum effective rate of each path is obtained on the basis of any one of the information collection methods explained in the items A-2 to A-7, and the remaining rate estimation value is calculated.

Then, a path is selected, which has the maximum remaining rate estimation value of the remaining rate estimation values obtained for the paths.

B-4. Single Selection Method for Each Logical Circuit According to QoS Method

Hereinafter, a method for selecting a single path for each logical circuit with QoS in a case where there are multiple paths between a transmission unit and a reception unit will be explained.

Figure 18:
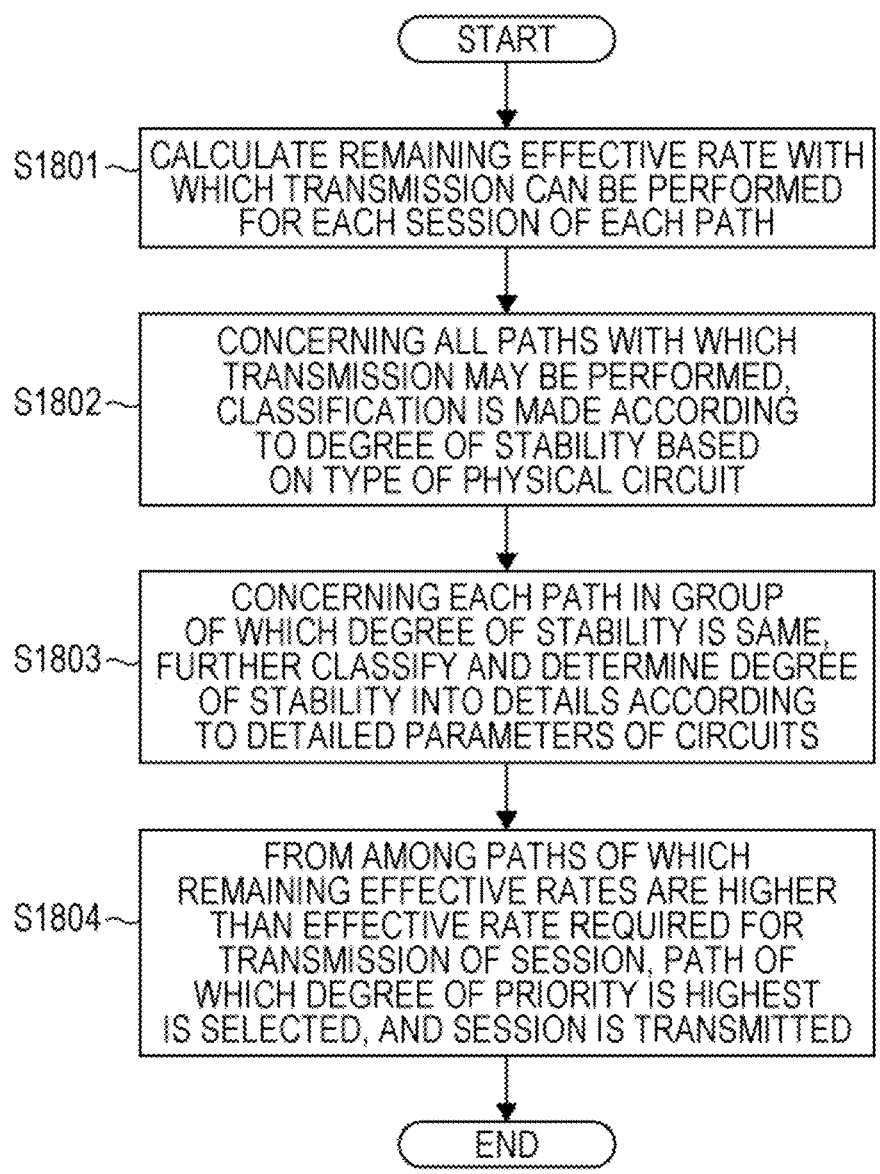
FIG. 18 is a flowchart illustrating processing procedure for selecting a single path for each logical circuit in view of QoS.

In FIG. 18, processing procedure for selecting a single path for each logical circuit in view of QoS is shown as a form of flowchart.

First, for example, according to the processing procedure as illustrated in FIG. 15, the remaining effective rate with which transmission can be performed for each session of each path (step S1801).

Subsequently, the physical method of each path is arranged in order from the perspective of transmission stability (step S1802).

The "transmission stability" referred to herein can be classified by the type of the physical circuit. For example, the transmission stability is higher in the following order: IEEE802.3>coaxial>Wi-Fi, PLC. The transmission stability can be classified within the same physical circuit. For example, in the case of IEEE802.3, the transmission stability is higher in the following order: 1000Base-T Full Duplex>100Base-TX Full Duplex>10Base-T Full Duplex>10BaseT Half Duplex. However, in the case of RF system (including coaxial, PLC system), a network having stabilization algorithm applied thereto is more stable in terms of transmission than best effort type networks. When the reception level is almost at the same level, lower Phy rate provides more stable transmission. A higher reception level provides more stable transmission than a lower reception level.

Alternatively, a user may give order of priority to the physical method of each path from the view point of transmission stability.

Subsequently, for each path in a group of which stability is the same, the stability is further classified and determined according to the detailed parameters of the circuit (step S1803).

Then, in a stream that is to be transmitted in view of QoS, a path is selected, of which remaining effective rate is more than the effective rate required to transmit a session, from among sessions of which degree of priority given in the steps S1802 to S1803 is the highest (which means the highest degree of stability), and the session is transmitted (step S1804).

B-5. Weighting Method with Multi-Selection Method

Hereinafter, a method for performing transmission upon distributing the load in accordance with the capacities of paths in a case where there are multiple paths between a transmission unit and a reception unit will be explained. For example, this is a case where one session uses multiple paths, and the path is assigned for each packet according to this method.

Figure 19A:
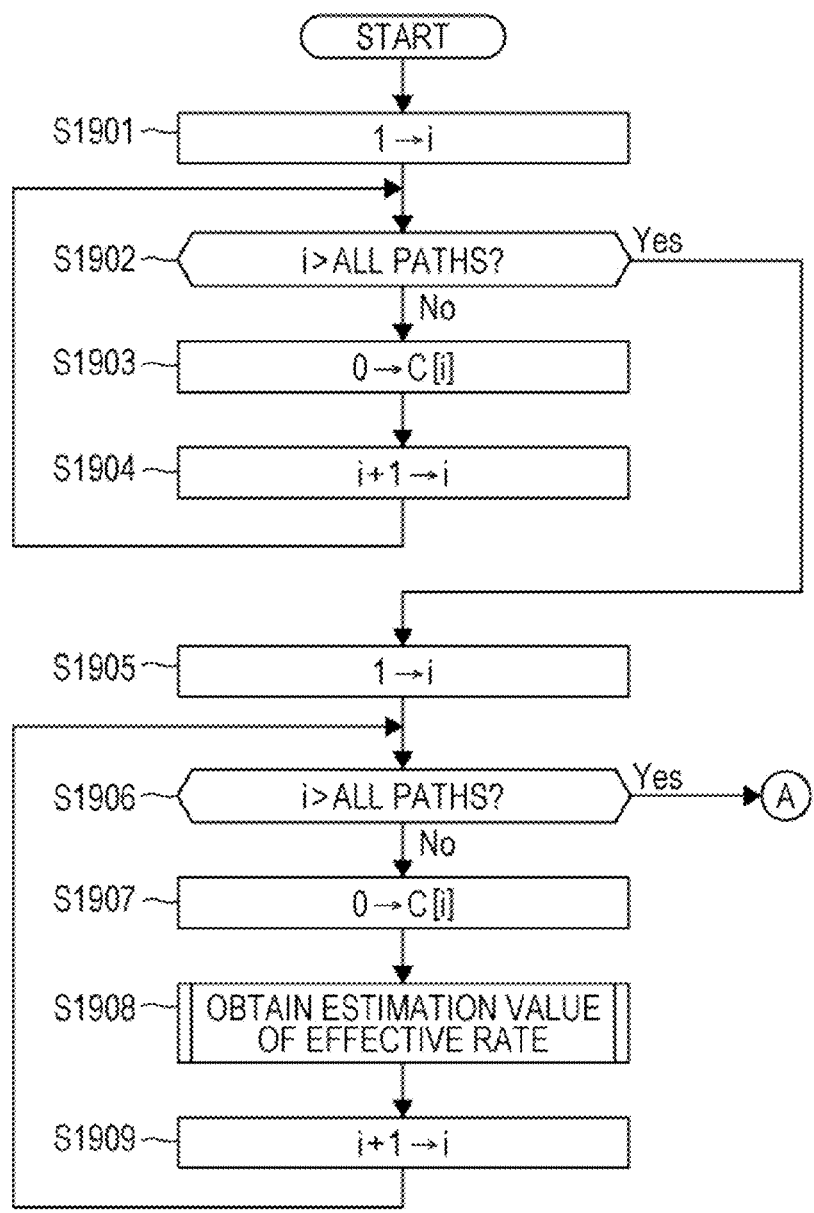
FIG. 19A is a flowchart illustrating processing procedure for performing transmission while distributing the load, in accordance with the capacity, among multiple paths existing between a transmission unit and a reception unit.
Figure 19B:
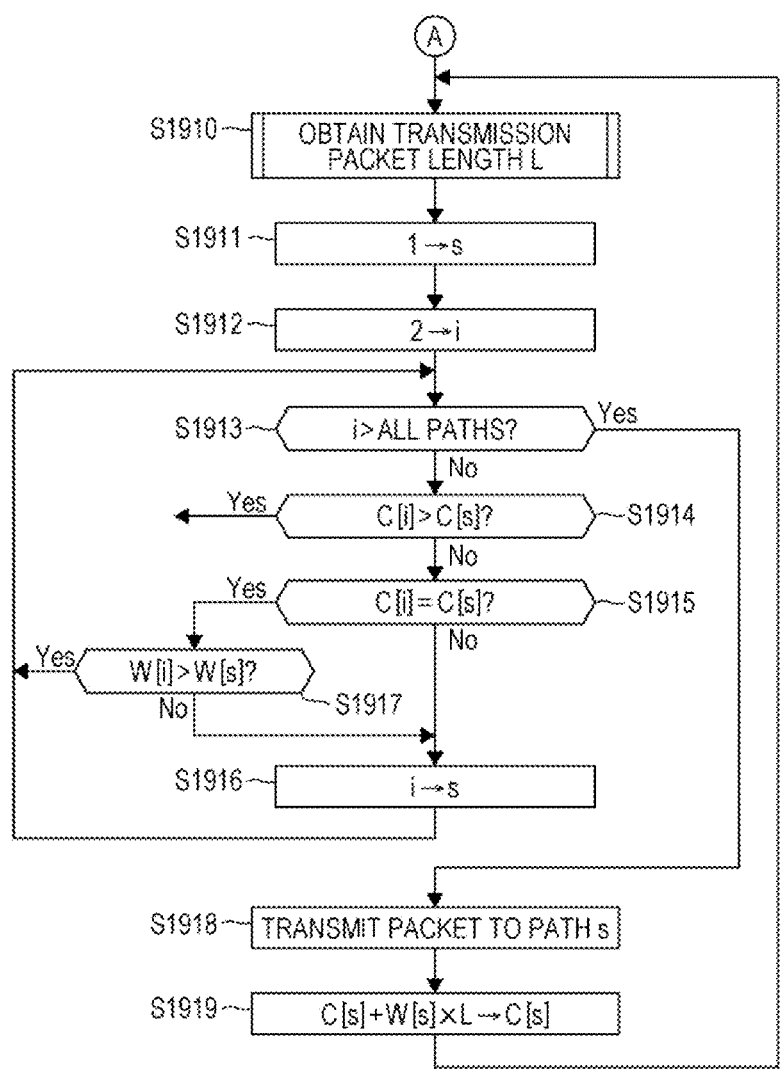
FIG. 19B is a flowchart illustrating processing procedure for performing transmission while distributing the load, in accordance with the capacity, among multiple paths existing between a transmission unit and a reception unit.

In FIGS. 19A and 19B, processing procedure for performing transmission while distributing the load, in accordance with the capacity, among multiple paths existing between a transmission unit and a reception unit is shown as a form of flowchart.

First, for each path, credit $C[i]$ representing the load distributed to a path i is defined, and each credit $C[i]$ is initialized as zero (step S1901 to 1904).

Subsequently, using the information processing method explained in the items A-2 to A-7, the estimation value of the maximum effective rate of the path i is obtained (step S1907), and a weight $W[i]$ of the path i is defined on the basis of the estimation value of the maximum (remaining) effective rate (step S1908), and the above processing is carried out on all the paths (steps S1905 to 1909). In this case, the weight $W[i]$ of the path i is defined as the estimation value of $W[i]=1$/remaining effective rate.

Subsequently, a transmission packet length L is obtained (step S1910). Any method may be used to obtain the packet length L, and the detailed description thereabout is omitted here.

Then, a path s of which credit is the lowest is searched (steps S1911 to 1917), and a packet is transmitted from the path s (step S1918). When there are multiple paths of which credits are the lowest (Yes in step S1915), a path of which weight is the smallest is selected (step S1917).

Then, credit $C[s]$ of the path s through which transmission is performed is updated with $C[s]+W[s]\times L$ (step S1919).

The above steps S1910 to S1919 are repeatedly executed for every packet which is to be transmitted. Although not shown in the flowchart of FIG. 19, weight $W[i]$ of each path i is updated as necessary.

B-6. Multi-Selection Method by Redundancy Degree Attaching Method

Hereinafter, a method for performing transmission upon giving the degree of redundancy in a case where there are multiple paths between a transmission unit and a reception unit will be explained.

The transmission unit transmits the same packet to each of the multiple paths existing between the transmission unit and the reception unit. On the other hand, the reception unit performs reception processing on the first received packet, and discards the other packets. According to this method, any one of the same packets transmitted to the multiple paths may reach the reception unit, and therefore, the chance of reception of the packets is improved, and this enables stable communication.

In order to achieve this transmission method, a sequence number of a packet is described immediately after the MAC header of the packet (for example, LLC/SNAP header. When the reception unit receives multiple packets having the same sequence number, the reception unit selects the packet that is received first normally, and discards the other packets.

Figure 20:
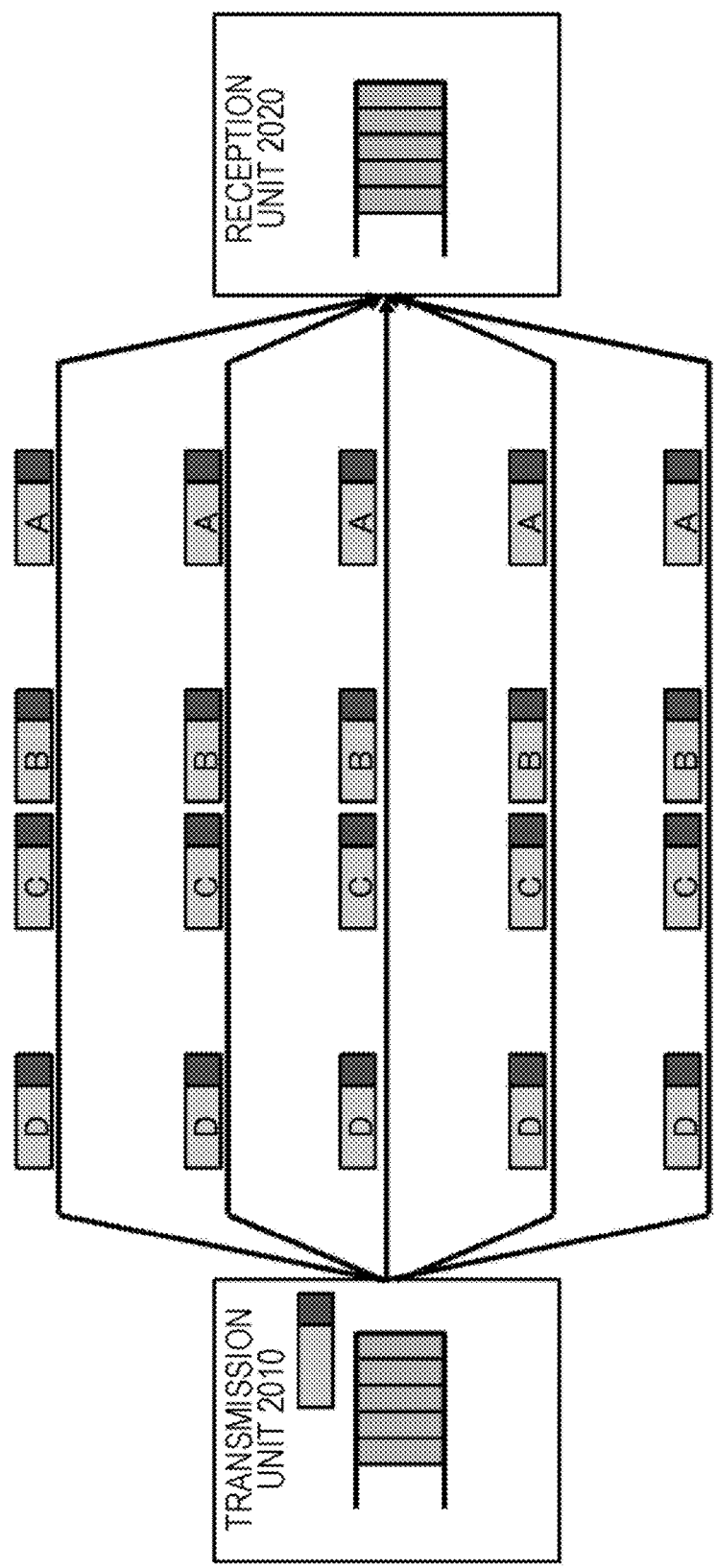
FIG. 20 is a figure for explaining a method for performing transmission while giving the degree of redundancy in a case where multiple paths exist between a transmission unit and a reception unit.

FIG. 20 illustrates an example of transmission method for selecting multiple paths by giving the degree of redundancy. In the method illustrated in the figure, a transmission unit 2010 transmits all the packets A, B, C, D, . . . to all the multiple paths existing between the transmission unit 2010 and a reception unit 2020. In response, when the reception unit 2020 receives multiple packets having the same sequence number, the reception unit selects the packet that is received first normally, and discards the other packets.

Figure 21:
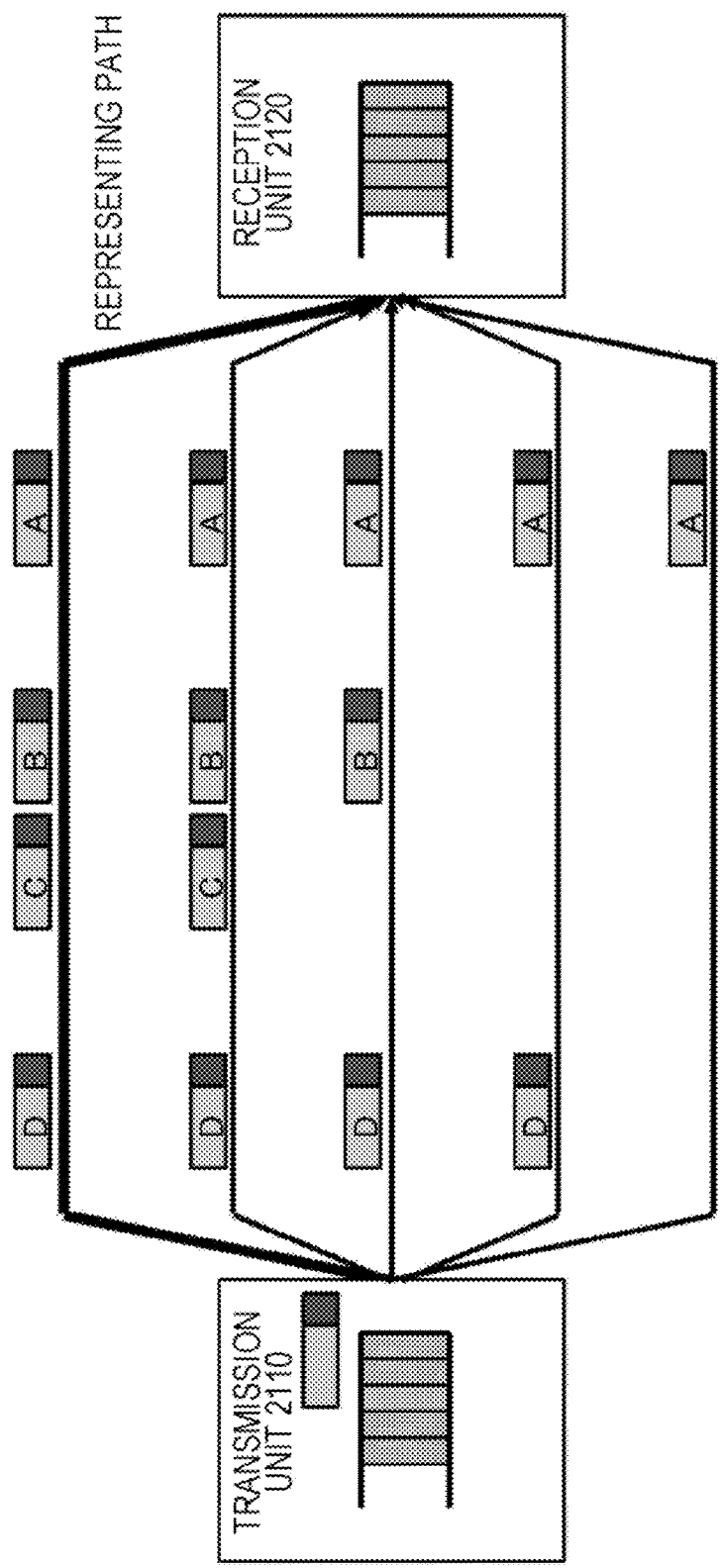
FIG. 21 is a figure for explaining another method for performing transmission while giving the degree of redundancy in a case where multiple paths exist between a transmission unit and a reception unit.

FIG. 21 illustrates another example of transmission method for selecting multiple paths by giving the degree of redundancy. In the method illustrated in the figure, any one of the multiple paths existing between the transmission unit 2110 and the reception unit 2110 is adopted as a representing path. The transmission unit 2110 transmits all the packets A, B, C, D, . . . to the representing path, but copies and transmits the packets as much as possible to the other paths. In response, when the reception unit 2120 receives multiple packets having the same sequence number, the reception unit selects the packet that is received first normally, and discards the other packets.

According to the path selection method explained in the item B-3 or B-4, the representing path can be selected from among multiple paths.

Figure 22:
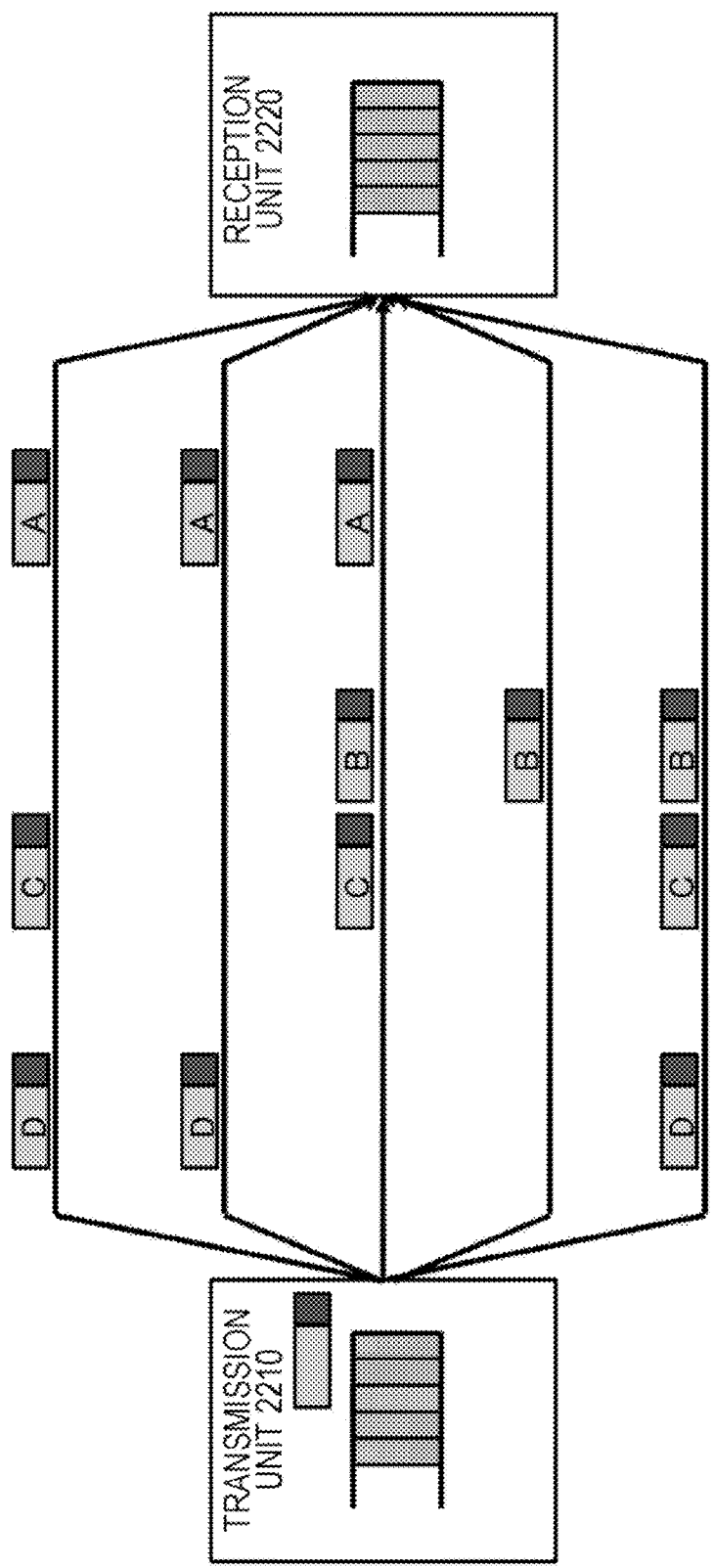
FIG. 22 is a figure for explaining still another method for performing transmission while giving the degree of redundancy in a case where multiple paths exist between a transmission unit and a reception unit.

FIG. 22 illustrates still another example of transmission method for selecting multiple paths by giving the degree of redundancy. In the method illustrated in the figure, a transmission unit 2210 determines the copy number for each of the packets A, B, C, D, . . . . Then, paths as many as the copy number are selected from among the multiple paths existing between the transmission unit 2210 and a reception unit 2220, and the packet is transmitted. In response, when the reception unit 2220 receives multiple packets having the same sequence number, the reception unit selects the packet that is received first normally, and discards the other packets. Any selection method may be used for the paths as many as the copy number.

It should be noted that the technique disclosed in this specification can be made as the following configuration.

(1) A communication apparatus including an information collection unit configured to collect information about each of a plurality of paths existing between the communication apparatus and the other party in communication, a path selection unit configured to select a single path or two or more paths from among the plurality of paths, on the basis of the information collected by the information collection unit, and a data transmission unit configured to transmit data upon distributing packets to the path selected by the path selection unit.

(2) The communication apparatus according to (1), wherein the information collection unit measures an effective rate of each path on the basis of an arrival interval of packets at the other party in communication when packets having a length of predetermined bytes is transmitted to the path as a burst.

(3) The communication apparatus according to (1), wherein the information collection unit includes a maximum effective rate table describing correspondence relationship of a physical layer rate and a maximum effective rate of each path, and obtains a maximum effective rate corresponding to a physical layer rate determined by the data transmission unit in each path from the maximum effective rate table.

(4) The communication apparatus according to (3), wherein the information collection unit dynamically finds the maximum effective rate by obtaining a physical layer rate with a regular interval of time for a path of which physical layer rate dynamically changes.

(5) The communication apparatus according to (3), wherein the information collection unit looks up the physical layer rate determined by the data transmission unit in the maximum effective rate table in a path connected to the other party in communication via a same access point, thereby obtaining a first maximum effective rate of a first half of the path from the communication apparatus to the access point, and receives a signal from the access point to the other party in communication, looks up the physical rate determined based on the reception signal in the maximum effective rate table, obtains the second maximum effective rate of a latter half of the path from the access point to the other party in communication, and on the basis of the first and the second maximum effective rates, estimates the maximum effective rate via the access point to the other party in communication.

(6) The communication apparatus according to (3), wherein the information collection unit looks up the physical layer rate determined by the data transmission unit in the maximum effective rate table in a path connected to the other party in communication via a same access point, thereby obtaining a first maximum effective rate of a first half of the path from the communication apparatus to the access point, and receives information about the physical rate of a signal from the access point to the other party in communication from the other party in communication, looks it up in the maximum effective rate table to obtain the second maximum effective rate of a latter half of the path from the access point to the other party in communication, and on the basis of the first and the second maximum effective rates, estimates the maximum effective rate via the access point to the other party in communication.

(7) The communication apparatus according to (5) or (6), wherein when a path from the communication apparatus to the access point and a path from the access point to the other party in communication belong to the same frequency, the information collection unit estimates the maximum effective rate to the other party in communication via the access point on the basis of an average value of the first maximum effective rate and the second maximum effective rate, and when the path from the communication apparatus to the access point and the path from the access point to the other party in communication belong to different frequencies, the information collection unit estimates the maximum effective rate via the access point to the other party in communication on the basis of the first maximum effective rate or the second maximum effective rate whichever is smaller.

(8) The communication apparatus according to (1), wherein the information collection unit includes a maximum effective rate table describing correspondence relationship of a received power level and a maximum effective rate of a path connected using wireless technique, and estimates the maximum effective rate of the path by looking up, in the maximum effective rate table, a received power level measured in a path directly connected to the other party in communication using the wireless technique.

(9) The communication apparatus according to (8), wherein the information collection unit includes a plurality of maximum effective rate tables according to a transmission parameter including at least one of supported maximum stream number, whether aggregation is effective or not, aggregation maximum size, MTU length, protocol, and used frequency, and obtains a transmission parameter of a path directly connected to the other party in communication using the wireless technique, and estimates the maximum effective rate of the path by looking it up the corresponding maximum effective rate table.

(10) The communication apparatus according to (3), wherein the information collection unit obtains the estimation value of the maximum effective rate of a path using a wireless technique, on the basis of statistics information about the path using the wireless technique, and a maximum effective rate obtained by looking up, in the maximum effective rate table, the physical layer rate of the path using the wireless technique.

(11) The communication apparatus according to (10), wherein the information collection unit obtains a normal transmission rate of a packet transmitted with the physical layer rate to a path using the wireless technique in a predetermined period in the past, as the statistics information about the path using the wireless technique, and multiplies the maximum effective rate obtained by looking up the maximum effective rate table by the normal transmission rate, and obtains the estimation value of the maximum effective rate of the path using the wireless technique.

(12) The communication apparatus according to (2), wherein when a single path is selected for each session, the path selection unit obtains an estimation value of a remaining rate of each path on the basis of a measurement value of an effective rate of each path, and selects a path of which remaining rate estimation value is the maximum.

(13) The communication apparatus according to (3) to (11), wherein when a single path is selected for each session, the path selection unit calculates a summation of predicted effective rates of sessions that are already transmitted in paths, and obtains an estimation value of a remaining rate for each path by subtracting the predicted effective rate summation value from the estimation value of the maximum effective rate of each path by the information collection unit, and selects a path of which remaining rate estimation value is the maximum.

(14) The communication apparatus according to (12) or (13), wherein the path selection unit gives an order of priority to the paths on the basis of transmission stability, and selects a path of which order of priority is the highest from among paths of which remaining effective rates are higher than the effective rate required to transmit the session.

(15) The communication apparatus according to (1), wherein when a single path is selected for each logical circuit, the path selection unit obtains an estimation value of a remaining rate of each path, and selects a path of which remaining rate estimation value is the maximum.

(16) The communication apparatus according to (1), wherein when a single path is selected for each logical circuit, the path selection unit obtains an estimation value of a remaining rate of each path, and selects a path of which order of priority is the highest from among paths of which remaining effective rates are higher than the effective rate required to transmit the session.

(17) The communication apparatus according to (1), wherein the path selection unit selects a path so that load is distributed in accordance with capacity of each path.

(18) The communication apparatus according to (17), wherein the path selection unit defines a credit representing a load of each path, selects a path of which credit is the lowest, defines a weight of each path from a remaining rate estimation value of each path on the basis of the information obtained by the information collection unit, and updates the credit of the path by adding a value obtained by multiplying a size of a packet transmitted to the selected path by a weight of the path.

(19) The communication apparatus according to (1), wherein the path selection unit selects two or more paths from among the plurality of paths, and the data transmission unit transmits the same packet to the two or more paths selected by the path selection unit.

(20) The communication apparatus according to (19), wherein the data transmission unit transmits all the packets to all the paths selected by the path selection unit.

(21) The communication apparatus according to (19), wherein the data transmission unit adopts, as representing paths, some of the two or more paths selected by the path selection unit, transmits a packet to all the representing paths, and transmits a copy of the packet to the remaining paths as much as possible.

(22) The communication apparatus according to (19), wherein the data transmission unit determines a copy number for each packet, and selects paths as many as the copy number from among the two or more paths selected by the path selection unit, and transmits packets thereto.

(23) A communication method including an information collection step for collecting information about each of a plurality of paths existing between the communication apparatus and the other party in communication, a path selection step for selecting a single path or two or more paths from among the plurality of paths, on the basis of the information collected by the information collection unit, and a data transmission step for transmitting data upon distributing packets to the path selected by the path selection unit.

(24) A communication system, where a plurality of paths exist between a transmission communication apparatus and a reception communication apparatus, wherein the transmission communication apparatus selects a single path or two or more paths from among the plurality of paths, on the basis of the information collected from each of the plurality of paths, and transmits data upon distributing packets to the path selected.

INDUSTRIAL APPLICABILITY

The technique disclosed in this specification has been described hereinabove in detail with reference to the particular embodiment. However, it is obvious that a person skilled in the art could modify the embodiment and employ an alternative in the embodiment without deviating from the gist of the technique disclosed in this specification.

The technique disclosed in this specification can be applied to, for example, IP communication path, similar connectionless packet communication, or home network, carrier network, and medium-sized network such as enterprise LAN.

The technique disclosed in this specification can be applied to IEEE802.3 system, IEEE802.11 system, PLC system, MoCA, coaxial lines system, communication systems combined with other signals such as HDMI, DiiVA, intra-carrier communication systems such as ATM, SONET, SDH, wireless access network system such as W-CDMA, CDMA2000, WiMAX, LTE, access network systems such as ADSL, FTTH, and all the other circuit systems for transmitting packets.

In short, this technique has been disclosed as a form of example, and the content of the description of this specification should not be interpreted in a limiting manner. In order to determine the gist of this technique, claims should be taken into consideration.

REFERENCE SIGNS LIST

110, 210, 310, 610, 710, 810, 910, 1010, 1210, 1310, 1410, 2010, 2110, 2210 . . . Transmission unit
111, 211 . . . Transmission host unit
113, 213 . . . L2 termination unit
120, 220, 320, 620, 720, 820, 920, 1020, 1220, 1320, 1420, 2020, 2120, 2220 . . . Reception unit
121, 221 . . . Reception host unit
123, 231 . . . L2 termination unit
230, 330, 340 . . . Relay terminal
232 . . . Switch unit
730, 830 . . . Access point

The invention claimed is:

1. A first communication apparatus, comprising:
an information collection unit configured to:
store a first maximum effective rate table that describes a first correspondence relationship between maximum effective rates and physical layer rates of a plurality of paths;
determine, based on the first maximum effective rate table, a first maximum effective rate of a first part of a first path of the plurality of paths,
wherein the first path corresponds to a communication link between the first communication apparatus and a second communication apparatus via an access point;
receive a signal from the access point;
determine, based on the received signal and the first maximum effective rate table, a second maximum effective rate of a second part of the first path; and
estimate, based on the first maximum effective rate and the second maximum effective rate, a third maximum effective rate of the first path;
a path selection unit configured to select the first path from the plurality of paths, based on the third maximum effective rate of the first path that is highest among the maximum effective rates of the plurality of paths; and
a data transmission unit configured to transmit data through the selected first path.

2. The first communication apparatus according to claim 1,
wherein the information collection unit is further configured to measure an effective rate of each of the plurality of paths based on an arrival interval of a plurality of transmitted packets at the second communication apparatus, and
wherein the plurality of packets that have a fixed length are transmitted as a burst to each of the plurality of paths.

3. The first communication apparatus according to claim 1, wherein the information collection unit is further configured to:
determine a fourth maximum effective rate of a second path of the plurality of paths, that corresponds to a first physical layer rate of the second path, from the first maximum effective rate table,
wherein the data transmission unit is further configured to determine the physical layer rates of the plurality of paths.

4. The first communication apparatus according to claim 3, wherein the information collection unit is further configured to obtain the first physical layer rate of the second path at a regular interval of time, based on the first physical layer rate of the second path that changes dynamically.

5. The first communication apparatus according to claim 1,
wherein the data transmission unit is further configured to:
determine a first physical layer rate of the first part of the first path; and
determine a second physical layer rate of the second part of the first path, based on the received signal, and
wherein the information collection unit is further configured to:
look up the first physical layer rate in the first maximum effective rate table to determine the first maximum effective rate of the first part of the first path,
wherein the first part of the first path is between the first communication apparatus and the access point;
look up the second physical layer rate in the first maximum effective rate table to determine the second maximum effective rate of the second part of the first path,
wherein the second part of the first path is between the access point and the second communication apparatus; and
estimate, based on the first maximum effective rate and the second maximum effective rate, the third maximum effective rate of the first path.

6. The first communication apparatus according to claim 3,
wherein the information collection unit is further configured to:
look up a first physical layer rate of the first part of the first path, determined by the data transmission unit, in the first maximum effective rate table to determine the first maximum effective rate of the first part of the first path,
wherein the first part of the first path is between the first communication apparatus and the access point;
receive information about a second physical layer rate of the second part of the first path,
wherein the second part of the first path is between the access point to the second communication apparatus;
look up in the first maximum effective rate table, based on the information about the second physical layer rate, to determine the second maximum effective rate of the second part of the first path; and
estimate, based on the first maximum effective rate and the second maximum effective rate, the third maximum effective rate of the first path.

7. The first communication apparatus according to claim 5, wherein the information collection unit is further configured to:
estimate, the third maximum effective rate of the first path as an average value of the first maximum effective rate and the second maximum effective rate, based on both of the first part of the first path and the second part of the first path that correspond to a same frequency; and
the third maximum effective rate of the first path as a smaller one of the first maximum effective rate or the second maximum effective rate, based on each of the first part of the first path and the second part of the first path that correspond to a different frequency.

8. The first communication apparatus according to claim 1, wherein the information collection unit is further configured to:
store the first maximum effective rate table that further describes a second correspondence relationship of at least a received power level and a fourth maximum effective rate of a wireless path of the plurality of paths; and
look up, in the first maximum effective rate table, the received power level in the wireless path to estimate the fourth maximum effective rate of the wireless path.

9. The first communication apparatus according to claim 8, wherein the information collection unit is further configured to:
store a plurality of maximum effective rate tables, each based on a transmission parameter that includes at least one of supported maximum stream number, whether aggregation is effective, aggregation maximum size, MTU length, protocol, or used frequency;

obtain the transmission parameter of the wireless path that is directly connected to the second communication apparatus; and look up the obtained transmission parameter in a second maximum effective rate table to estimate the fourth maximum effective rate of the wireless path, wherein the plurality of maximum effective rate tables includes the first maximum effective rate table and the second maximum effective rate table.

10. The first communication apparatus according to claim 3, wherein the information collection unit is further configured to:

obtain an estimation value of a fifth maximum effective rate of a wireless path, based on statistics information about the wireless path; and look up, in the first maximum effective rate table, a second physical layer rate of the wireless path, to obtain the fifth maximum effective rate of the wireless path.

11. The first communication apparatus according to claim 10, wherein the information collection unit is further configured to:

obtain a normal transmission rate of a packet transmitted with the second physical layer rate to the wireless path in a determined period, as the statistics information;

look up the first maximum effective rate table to obtain the fifth maximum effective rate;

multiply the fifth maximum effective rate by the normal transmission rate; and obtain the estimation value of the fifth maximum effective rate of the wireless path.

12. The first communication apparatus according to claim 2, wherein based on a selection of a single path of the plurality of paths for each session, the path selection unit is further configured to:

obtain an estimation value of a remaining rate of each of the plurality of paths, based on a measurement value of the effective rate of each of the plurality of paths; and select a second path with a maximum remaining rate estimation value from among the plurality of paths.

13. The first communication apparatus according to claim 3, wherein based on a selection of a single path of the plurality of paths for each session of a first plurality of sessions, the path selection unit is further configured to:

calculate a summation value, based on a summation of predicted effective rates of a second plurality of sessions that are transmitted in the plurality of paths;

obtain a first estimation value of a remaining rate for each of the plurality of paths by subtraction of the summation value from a second estimation value of each of the maximum effective rates of the plurality of paths; and select a third path with a maximum remaining rate estimation value from among the plurality of paths.

14. The first communication apparatus according to claim 12, wherein the path selection unit is further configured to:

set an order of priority to each of the plurality of paths, based on transmission stability; and select a third path with highest order of priority from the plurality of paths and with a remaining effective rate higher than a threshold effective rate.

15. The first communication apparatus according to claim 1, wherein based on a selection of a single path of the plurality of paths for each logical circuit, the path selection unit is further configured to:

obtain an estimation value of a remaining rate of each of the plurality of paths; and select a second path with a maximum remaining rate estimation value of the plurality of paths.

16. The first communication apparatus according to claim 1, wherein based on a selection of a single path of the plurality of paths for each logical circuit, the path selection unit is further configured to:

obtain an estimation value of a remaining rate of each of the plurality of paths; and select a second path with highest order of priority from the plurality of paths and with a remaining effective rate higher than a threshold effective rate required to transmit a session.

17. The first communication apparatus according to claim 1, wherein the path selection unit is further configured to select a second path such that, load is distributed based on capacity of each of the plurality of paths.

18. The first communication apparatus according to claim 17, wherein the path selection unit is further configured to:

define a credit that represents load of each of the plurality of paths;

select a third path of the plurality of paths, with lowest credit;

define a weight of each of the plurality of paths from a remaining rate estimation value of each of the plurality of paths based on the maximum effective rates; and update the credit of the selected third path, based on addition of a first value to the credit of the selected third path, wherein the first value is obtained based on multiplication of a size of a packet transmitted to the selected third path by the weight of the selected third path.

19. The first communication apparatus according to claim 1, wherein the path selection unit is further configured to select at least two paths from among the plurality of paths, and the data transmission unit is further configured to transmit a first packet to each of the at least two paths.

20. The first communication apparatus according to claim 19, wherein the data transmission unit is further configured to transmit a plurality of packets to each of the at least two paths, and wherein the plurality of packets includes the first packet.

21. The first communication apparatus according to claim 19, wherein the data transmission unit is further configured to:

adopt, as representative paths, the at least two paths;

transmit the first packet to the representative paths; and transmit a copy of the first packet to remaining paths of the plurality of paths.

22. The first communication apparatus according to claim 19, wherein the data transmission unit is further configured to:

determine a copy number for the first packet; and select a number of paths that is equal to the copy number, from the at least two paths; and transmit the first packet to the selected number of paths.

23. A communication method, comprising:

in a first communication apparatus configured to communicate with a second communication apparatus via a plurality of paths:

storing a maximum effective rate table that describes a correspondence relationship between maximum effective rates and physical layer rates of the plurality of paths;

determining, based on the maximum effective rate table, a first maximum effective rate of a first part of a first path of the plurality of paths, wherein the first path corresponds to a communication link between the first communication apparatus and the second communication apparatus via an access point;

receiving a signal from the access point;

determining, based on the received signal and the maximum effective rate table, a second maximum effective rate of a second part of the first path;

estimating, based on the first maximum effective rate and the second maximum effective rate, a third maximum effective rate of the first path;

selecting the first path from the plurality of paths, based on the third maximum effective rate of the first path that is highest among the maximum effective rates of the plurality of paths; and transmitting through the selected first path.

24. A communication system, comprising:

a first communication apparatus and a second communication apparatus, wherein a plurality of paths exist between the first communication apparatus and the second communication apparatus, wherein the first communication apparatus is configured to:

store a maximum effective rate table that describes a correspondence relationship between maximum effective rates and physical layer rates of the plurality of paths;

determine, based on the maximum effective rate table, a first maximum effective rate of a first part of a first path of the plurality of paths, wherein the first path corresponds to a communication link between the first communication apparatus and the second communication apparatus via an access point;

receive a signal from the access point;

determine, based on the received signal and the maximum effective rate table, a second maximum effective rate of a second part of the first path; and estimate, based on the first maximum effective rate and the second maximum effective rate, a third maximum effective rate of the first path;

select the first path from the plurality of paths, based on the third maximum effective rate of the first path that is highest among the maximum effective rates of the plurality of paths; and transmit data through the selected first path to the second communication apparatus.

* * * * *